US011667809B2

(12) United States Patent
Gibanel et al.

(10) Patent No.: US 11,667,809 B2
(45) Date of Patent: Jun. 6, 2023

(54) ADHESION PROMOTERS AND COMPOSITIONS FOR CONTAINERS AND OTHER ARTICLES

(71) Applicant: SWIMC LLC, Cleveland, OH (US)

(72) Inventors: Sebastien Gibanel, Givry (FR); Benjamin Campagne, Montbellet (FR); Marie Braillon-Girard, Tournus (FR)

(73) Assignee: SWIMC LLC, Cleveland, OH (US)

( * ) Notice: Subject to any disclaimer, the term of this patent is extended or adjusted under 35 U.S.C. 154(b) by 318 days.

(21) Appl. No.: 16/640,707

(22) PCT Filed: Aug. 24, 2018

(86) PCT No.: PCT/US2018/047870
§ 371 (c)(1),
(2) Date: Feb. 20, 2020

(87) PCT Pub. No.: WO2019/040823
PCT Pub. Date: Feb. 28, 2019

(65) Prior Publication Data
US 2020/0354605 A1 Nov. 12, 2020

Related U.S. Application Data

(60) Provisional application No. 62/550,071, filed on Aug. 25, 2017.

(51) Int. Cl.
B32B 1/02 (2006.01)
B32B 1/08 (2006.01)
B32B 27/18 (2006.01)
C09D 7/60 (2018.01)
C09D 7/63 (2018.01)
C09D 7/65 (2018.01)
B32B 15/08 (2006.01)
C09D 167/00 (2006.01)
C08G 18/80 (2006.01)
C08K 5/00 (2006.01)
C08K 5/42 (2006.01)
C08K 5/5313 (2006.01)
C08K 5/5317 (2006.01)
C09D 151/00 (2006.01)
C09D 165/02 (2006.01)
C09J 163/04 (2006.01)

(52) U.S. Cl.
CPC .............. C09D 167/00 (2013.01); B32B 1/02 (2013.01); B32B 1/08 (2013.01); B32B 15/08 (2013.01); B32B 27/18 (2013.01); C08G 18/80 (2013.01); C08K 5/0025 (2013.01); C08K 5/42 (2013.01); C08K 5/5313 (2013.01); C08K 5/5317 (2013.01); C09D 7/60 (2018.01); C09D 7/63 (2018.01); C09D 7/65 (2018.01); C09D 151/003 (2013.01); C09D 165/02 (2013.01); C09J 163/04 (2013.01); C08G 2390/40 (2013.01); C09J 2463/00 (2013.01)

(58) Field of Classification Search
None
See application file for complete search history.

(56) References Cited

U.S. PATENT DOCUMENTS

| 4,059,550 | A | * | 11/1977 | Shimp ........................ C08J 3/07 523/404 |
| 5,001,173 | A | * | 3/1991 | Anderson ................ C08K 3/22 428/416 |
| 6,028,162 | A | * | 2/2000 | Hahn ................... C09D 167/00 428/411.1 |
| 9,617,446 | B2 | | 4/2017 | Pompignano et al. |
| 9,670,378 | B2 | | 6/2017 | Moussa et al. |
| 2015/0197657 | A1 | * | 7/2015 | Niederst .............. C08G 59/066 220/62.12 |
| 2016/0257845 | A1 | | 9/2016 | Park et al. |
| 2017/0051174 | A1 | | 2/2017 | List et al. |

FOREIGN PATENT DOCUMENTS

| CN | 103013303 | | 4/2013 | |
| EP | 3026088 | | 6/2016 | |
| JP | 2002097345 A | * | 4/2002 | |
| JP | 2007284541 | | 11/2007 | |
| WO | WO2011009024 | | 1/2011 | |
| WO | WO2012089747 | | 7/2012 | |
| WO | WO2014025411 | | 2/2014 | |
| WO | WO2014139971 | | 9/2014 | |
| WO | WO-2016149700 A1 | * | 9/2016 | ......... C08G 59/4071 |
| WO | WO 2012/162301 | | 11/2021 | |

OTHER PUBLICATIONS

Machine translation of JP-2002097345-A (No Date).*
International Search Report and Written Opinion for International Application PCT/US2018/047870 dated Nov. 5, 2018.
Cardolite® NC-514 Flexible Epoxy Resin Technical Datasheet, 2 pgs, Mar. 2009.
EPALLOY® 5200—Huntsman, 2 pgs, Aug. 2021.
Soto et al., "Evidence of Absence: Estrogenicity Assessment of a New Food-Contact Coating and the Bisphenol Used in Its Synthesis," Environmental Science & Technology, 51(3): 1718-1726, Jan. 2017.

(Continued)

Primary Examiner — Michael J Feely
(74) Attorney, Agent, or Firm — Patterson Thuente, P.A.

(57) ABSTRACT

This invention provides a coating composition that contains an aromatic adhesion promoter. Containers and other articles comprising the coatings and methods of making such containers and other articles are also provided. The invention further provides compositions including the adhesion promoter, which have utility in a variety of coating end uses, including, for example, valve and pipe coatings.

32 Claims, No Drawings

(56) References Cited

OTHER PUBLICATIONS

Szafran et al., "Characterizing properties of non-estrogenic substituted bisphenol analogs using high throughput microscopy and image analysis," 12(7): 19 pgs., Jan. 2017.
Test Method Nomination: MCF-7 Cell Proliferation Assay of Estrogenic Activity, 102 pgs, 2006.

* cited by examiner

ADHESION PROMOTERS AND COMPOSITIONS FOR CONTAINERS AND OTHER ARTICLES

CROSS REFERENCE TO RELATED APPLICATIONS

This application is a national stage filing under 35 U. S.C. § 371 of International Application No. PCT/US2018/047870 filed on Aug. 24, 2018, which claims priority to U.S. Provisional Application No. 62/550,071 filed on Aug. 25, 2017, both of which are entitled "ADHESION PROMOTERS AND COMPOSITIONS FOR CONTAINERS AND OTHER ARTICLES" and the disclosures of both of which are incorporated herein by reference in their entirety.

BACKGROUND

The application of coatings to metals to retard or inhibit corrosion is well established. This is particularly true in the area of packaging containers such as metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food contact, not adversely affect the taste of the packaged food or beverage product, have excellent adhesion to the substrate, resist staining and other coating defects such as "popping," "blushing" or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including polyvinyl-chloride-based coatings and epoxy-based coatings incorporating bisphenol A ("BPA"). Each of these coating types, however, has potential shortcomings. For example, the recycling of materials containing polyvinyl chloride or related halide-containing vinyl polymers can be problematic. There is also a desire by some to reduce or eliminate certain BPA-based compounds commonly used to formulate food-contact epoxy coatings.

What is needed in the marketplace is an improved binder system for use in coatings such as, for example, packaging coatings.

SUMMARY

This invention provides a coating composition, comprising a binder polymer and an aromatic adhesion promoter. The coating composition is substantially free of each of mobile or bound bisphenol A, bisphenol F, bisphenol S, and other polyhydric phenols that exhibit an estrogenic agonist activity in the MCF-7 assay greater than or equal to that exhibited by 4,4'-(propane-2,2-diyl)diphenol in the assay, and epoxides thereof.

The present invention also provides packaging articles having a coating composition of the present invention applied to a surface of the packaging article. In one embodiment, the packaging article is a container such as a food or beverage container, or a portion thereof (e.g., a twist-off closure lid, beverage can end, food can end, etc.), wherein at least a portion of an interior surface of the container is coated with a coating composition described herein that is suitable for prolonged contact with a food or beverage product or other packaged product.

In one embodiment, a method of preparing a container is provided that includes a coating of the present invention. The method includes: providing a coating composition described herein; and applying the coating composition to at least a portion of a surface of a substrate prior to or after forming the substrate into a container or a portion thereof having the coating composition disposed on a surface. Typically, the substrate is a metal substrate, although the coating composition may be used to coat other substrate materials if desired. Examples of other substrate materials may include fiberboard, plastic (e.g., polyesters such as, e.g., polyethylene terephthalates; nylons; polyolefins such as, e.g., polypropylene, polyethylene, and the like; ethylene vinyl alcohol; polyvinylidene chloride; and copolymers thereof) and paper.

In one embodiment, a method of forming food or beverage cans, or a portion thereof, is provided that includes: applying a coating composition described herein to a metal substrate (e.g., applying the coating composition to the metal substrate in the form of a planar coil or sheet), hardening the coating composition, and forming the substrate into a food or beverage can or a portion thereof.

In certain embodiments, forming the substrate into an article includes forming the substrate into a can end or a can body. In certain embodiments, the article is a two-piece drawn food can, three-piece food can, food can end, drawn and ironed food or beverage can, beverage can end, easy open can end, twist-off closure lid, and the like. Suitable metal substrates include, for example, steel or aluminum.

In certain embodiments, a packaging container is provided having: (a) a coating composition of the present invention disposed on at least a portion of an interior or exterior surface of the container and (b) a product packaged therein such as a food, beverage, cosmetic, or medicinal product.

In one embodiment, a packaging container having a coating composition of the present invention disposed on an interior surface is provided that includes a packaged product intended for human contact or consumption, e.g., a food or beverage product, a cosmetic product, or a medicinal product.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list. Unless otherwise indicated, the structural representations included herein are not intended to indicate any particular stereochemistry and are intended to encompass all stereoisomers.

Definitions

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

The term "cyclic group" means a closed ring hydrocarbon group that is classified as an alicyclic group or an aromatic group, both of which can include heteroatoms.

The term "alicyclic group" means a cyclic hydrocarbon group having properties resembling those of aliphatic groups.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.)

A group that may be the same or different is referred to as being "independently" something. Substitution on the organic groups of the compounds of the present invention is contemplated. The terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "polyhydric phenol" (which includes dihydric phenols) as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "phenylene" as used herein refers to a six-carbon atom aryl ring (e.g., as in a benzene group) that can have any substituent groups (including, e.g., hydrogen atoms, halogens, hydrocarbon groups, oxygen atoms, hydroxyl groups, etc.). Thus, for example, the following aryl groups are each phenylene rings: $—C_6H_4—$, $—C_6H_3(CH_3)—$, and $—C_6H(CH_3)_2Cl—$. In addition, for example, each of the aryl rings of a naphthalene group are phenylene rings.

The term "substantially free" of a particular mobile or bound compound means that the recited material or composition contains less than 1,000 parts per million (ppm) of the recited mobile or bound compound. The term "essentially free" of a particular mobile or bound compound means that the recited material or composition contains less than 100 parts per million (ppm) of the recited mobile or bound compound. The term "essentially completely free" of a particular mobile or bound compound means that the recited material or composition contains less than 5 parts per million (ppm) of the recited mobile or bound compound. The term "completely free" of a particular mobile or bound compound means that the recited material or composition contains less than 20 parts per billion (ppb) of the recited mobile or bound compound. If the aforementioned phrases are used without the term "mobile" or "bound" (e.g., "substantially free of BPA"), then the recited material or composition contains less than the aforementioned amount of the compound whether the compound is mobile or bound.

The term "mobile" means that the compound can be extracted from the cured coating when a coating (typically ~1 mg/cm2) is exposed to a test medium for some defined set of conditions, depending on the end use. An example of these testing conditions is exposure of the cured coating to HPLC-grade acetonitrile for 24 hours at 25° C.

The term "bound" when used in combination with one of the aforementioned phrases in the context, e.g., of a bound compound of a polymer or other ingredient of a coating composition (e.g., a polymer that is substantially free of bound BPA) means that the polymer or other ingredient contains less than the aforementioned amount of structural units derived from the compound. For example, a polymer that is substantially free of bound BPA includes less than 1,000 ppm (or 0.1% by weight), if any, of structural units derived from BPA. As will be appreciated by persons having ordinary skill in the art, determination of the amount of a bound compound of a polymer or other ingredient of a coating composition may be made by considering the amounts of starting materials employed and yields obtained when making such polymer, ingredient or coating composition.

When the phrases "does not include any," "free of" (outside the context of the aforementioned phrases), and the like are used herein, such phrases are not intended to preclude the presence of trace amounts of the pertinent structure or compound which may be present due to environmental contaminants.

The terms "estrogenic activity" or "estrogenic agonist activity" refer to the ability of a compound to mimic hormone-like activity through interaction with an endogenous estrogen receptor, typically an endogenous human estrogen receptor.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "unsaturated" when used in the context of a compound refers to a compound that includes at least one non-aromatic double bond.

The term "crosslinker" refers to a molecule capable of forming a covalent linkage between polymers or between two different regions of the same polymer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers).

As used herein, "acrylate resin" or "acrylic resin" means a resin that includes acrylate or methacrylate monomers, oligomers, or polymerizable polymers.

As used herein, "(meth)acrylate" is a shorthand reference to acrylate, methacrylate, or combinations thereof, and "(meth)acrylic" is a shorthand reference to acrylic, methacrylic, or combinations thereof.

As used herein, "crosslinker" refers to molecule capable of forming a covalent linkage between polymers or between two different regions of the same polymer.

As used herein, "grafted polyester-acrylate resin" refers to a resin preparation whereby a polyester resin is at least partially grafted to the backbone of an acrylate resin.

As used herein, "phenoplast" refers to phenolic resins which according to the norm DIN ISO 10082 are the condensation products of phenols and aldehydes, usually with formaldehyde. Depending on the choice of reaction conditions, phenolic resins may be self-reactive (thermally or acid reactive) resol resins or non-self-reactive novolak resins.

As used herein, "polybasic acid" refers to an organic acid containing at least two carboxylic acid groups.

As used herein, "polyhydric alcohol" refers to an alcohol containing at least two alcohol groups.

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polyether can be interpreted to mean that the coating composition includes "one or more" polyethers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION OF ILLUSTRATIVE EMBODIMENTS

In one aspect, the present invention provides a composition (preferably a coating composition) that includes (i) a polymer (more preferably a binder polymer) and (ii) an aromatic adhesion promoter. Although the ensuing discussion focuses primarily on coating end uses, it is contemplated that the aromatic adhesion promoter of the present invention may have utility in a variety of other end uses such as, for example, in adhesives or composites.

Coating compositions of the present invention preferably include at least (i) a film-forming amount of the polymer described herein and (ii) an adhesively effective amount of the aromatic adhesion promoter described herein. In addition to the polymer and aromatic adhesion promoter, the coating composition may also include one or more additional ingredients such as, for example, a crosslinker, a liquid carrier, and any other suitable optional additives. Although any suitable cure mechanism may be used, thermoset coating compositions are preferred. Moreover, although coating compositions including a liquid carrier are presently preferred, it is contemplated that the polymer of the present invention may have utility in solid coating application techniques such as, for example, powder coating.

Coating compositions of the present invention may have utility in a variety of end uses, including packaging coating end uses. Other coating end uses may include industrial coatings, marine coatings (e.g., for ship hulls), storage tanks (e.g., metal or concrete), architectural coatings (e.g., on cladding, metal roofing, ceilings, garage doors, etc.), gardening tools and equipment, toys, automotive coatings, metal furniture coatings, coil coatings for household appliances, floor coatings, and the like.

Preferred coating compositions of the present invention exhibit a superior combination of coating attributes such as good flexibility, good substrate adhesion, good chemical resistance and corrosion protection, good fabrication properties, and a smooth and regular coating appearance free of blisters and other application-related defects.

In preferred embodiments, the coating composition is suitable for use as an adherent packaging coating and, more preferably, as an adherent coating on an interior or exterior surface of a food or beverage container. Thus, in preferred embodiments, the coating composition is suitable for use as a food-contact coating. It is also contemplated that the coating composition may have utility in cosmetic packaging or medical packaging coating end uses, and as a drug-contact coating in particular (e.g., as an interior coating of a metered dose inhaler can—commonly referred to as an "MDI" container). It is also contemplated that the coating composition may have utility in coating applications in which the coated substrate will contact bodily fluids such as, e.g., as an interior coating of a blood vial.

The ingredients used to make the compositions of the present invention are preferably free of any dihydric phenols, or corresponding diepoxides (e.g., diglycidyl ethers), that exhibit an estrogenic agonist activity in the MCF-7 assay (discussed later herein) greater than or equal to that that exhibited by 4,4'-(propane-2,2-diyl)diphenol in the assay. More preferably, the aforementioned ingredients are free of any dihydric phenols, or corresponding diepoxides, that exhibit an estrogenic agonist activity in the MCF-7 assay greater than or equal to that of bisphenol S. Even more preferably, the aforementioned ingredients are free of any dihydric phenols, or corresponding diepoxides, that exhibit an estrogenic agonist activity in the MCF-7 assay greater than that of 4,4'-(propane-2,2-diyl)bis(2,6-dibromophenol). Optimally, the aforementioned ingredients are free of any dihydric phenols, or corresponding diepoxides, that exhibit an estrogenic agonist activity in the MCF-7 assay greater than about that of 2,2-bis(4-hydroxyphenyl)propanoic acid.

While not intending to be bound by any theory, it is believed that a dihydric phenol is less likely to exhibit any appreciable estrogenic agonist activity if the compound's chemical structure is sufficiently different from compounds having estrogenic activity such as diethylstilbestrol. The structures of preferred dihydric phenol compounds, as will be discussed herein, are sufficiently different such that the compounds do not bind and activate a human receptor. These preferred compounds are, in some instances, at least about 6 or more, orders of magnitude less active than diethylstilbestrol (e.g., when assessing estrogenic agonist effect using an in vitro assay such as the MCF-7 cell proliferation assay discussed later herein). Without being bound by theory, it is believed that such desirable structural dissimilarity can be introduced via one or more structural features, including any suitable combination thereof. For example, it is believed that one or more of the following structural characteristics can be used to achieve such structural dissimilarity:

segments of Formula IB steric hindrance (e.g., relative to one or more hydroxyl phenols), molecular weight that is arranged in three-dimensional space such that: (i) the compound does not fit, or does not readily fit, in the active site of a human estrogen receptor or (ii) the structural configuration interferes with activation of the human estrogen receptor once inside the active site, and the presence of polar groups (e.g., in addition to the two hydroxyl groups of a bisphenol compound).

Suitable polymers for use in the present invention include polyester resins, acrylic resins, polyether resins, grafted polyester-acrylic resins, grafted polyether-acrylic resins, grafted polyester-polyether resins, or combinations thereof. In one embodiment, the polymer can be incorporated into or form a water-soluble or water-dispersible system. In another embodiment the polymer can be incorporated into or form a solvent-based system. In addition to, or in place of, the aforementioned resins, other suitable polymeric resins include: aliphatic polyisocyanates {e.g., those resins commercially available under the trade names RHODOCOAT WT 1000 and TOLONATE D2 (P) (Rhodia CN 7500, Cranbury, N.J.), and DESMODUR BL 3175A (Bayer Material Science AG, D-51368, Leverkusen, Germany)} and hydrocarbon resins, including: coumarone-indene resins {(e.g., those resins commercially available under the trade name CUMAR R-21 (Neville Chemical Company, Pittsburgh, Pa.)}; and ethylene co-terpolymer resins, for example, those resins commercially available under the trade name MICHEM Prime 4983 (Michelman Inc., Cincinnati, Ohio).

Suitable binder resins for use in the present invention include the resins disclosed in U.S. Pat. Nos. 7,592,047 B2, 8,092,876 B2, 8,142,868 B2, 8,168,276 B2, 8,173,265 B2, 8,617,663 B2, 8,835,012 B2, 9,242,763 B2, 9,409,219 B2 and 9,415,900 B2; U.S. Published Application Nos. US 2013/0280455 A1, US 2013/0316109 A1, US 2015/0021323 A1, US 2015/0125642 A1, US 2017/0029657 A1, US 2017/0051177 A1, US 2017/0096521 A1 and US 2017/0096579 A1; and Published International Application Nos. WO 2016/105504 A1, WO 2016/118502 A1 and WO 2018/125895 A1.

Suitable polyester resins for use in the present invention include resins that are the reaction product of components that include a polybasic acid containing at least two carboxyl groups and a polyhydric alcohol containing at least two hydroxyl groups. In some embodiments, the polyester resin is a reaction product of components that include one or more of (and in some embodiments all of) propylene glycol, trimethylol propane, terephthalic acid, isophthalic acid, and maleic anhydride.

The polyester resins may be prepared by processes well known in the art comprising the condensation polymerization reaction of one or more polycarboxylic acids with one or more polyols. Examples of suitable polycarboxylic acids are phthalic acid, isophthalic acid, terephthalic acid, 1,4-cyclohexane dicarboxylic acid, succinic acid, sebacic acid, methyltetrahydrophthalic acid, methyl hexahydrophthalic acid, tetrahydrophthalic acid, dodecane dioic acid, adipic acid, azelaic acid, naphthylene dicarboxylic acid, pyromellitic acid, dimer fatty acids or trimellitic acid.

The polyol component is, for example, selected from diols or triols and preferably from mixtures thereof. Examples of suitable polyols include ethylene glycol, 1,3-propanediol, diethylene glycol, dipropylene glycol, triethylene glycol, 1,4-butanediol, 2-methyl-1,3-propanediol, 1,4-cyclohexane dimethanol, 1,6-hexanediol, neopentyl glycol, trimethylolpropane or glycerol. The polyester polymer preferably has a number average molecular weight between 1000 and 20,000 g/mole.

In some embodiments, the polyester polymers have an acid value between 0 and 20, preferably 0 to 10 mg of KOH/g, a hydroxyl number between 50 to 200, preferably 70 to 150 mg of KOH/g, a glass transition temperature (Tg) between −20° C. and +50° C., preferably −10° C. and +40° C.

Suitable acrylic resins for use in the present invention include resins that are the reaction product of components that include a (meth)acrylic acid ester, an ethylenically unsaturated mono- or multi-functional acid, and an optional oxirane-functional or vinyl compound.

Suitable polyether resins for use in the present invention include polyether polymers that include one or more segments of the below Formula (I), and more preferably a plurality of such segments.

Formula (I)

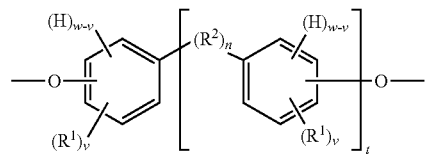

wherein:
each of the pair of oxygen atoms depicted in Formula (I) is preferably present in an ether or ester linkage, more preferably an ether linkage;
H denotes a hydrogen atom, if present;
each $R^1$ is preferably independently an atom or group preferably having at atomic weight of at least 15 Daltons that is preferably substantially non-reactive with an epoxy group;
v is independently 0 to 4, more preferably 1 to 4, even more preferably 2 to 4;
w is 4;
when v is 1 to 4, each of the phenylene groups depicted in Formula (I) preferably includes at least one $R^1$ attached to the ring preferably at an ortho or meta position relative to the oxygen atom;
$R^2$, if present, is preferably a divalent group;
n is 0 or 1, with the proviso that if n is 0, the phenylene groups depicted in Formula (I) can optionally join to form a fused ring system (e.g., a substituted naphthalene group) in which case w is 3 (as opposed to 4) and v is 0 to 3 (as opposed to 3);
t is 0 or 1; and
two or more $R^1$ or $R^2$ groups can optionally join to form one or more cyclic groups.

When t is 1, the segment of Formula (I) is a segment of the below Formula (IA).

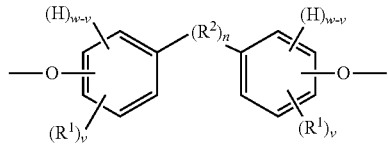

Formula (IA)

When t is 0, the segment of Formula (I) is a segment of the below Formula (IB).

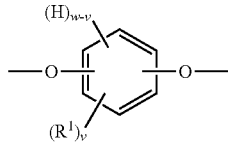

Formula (IB)

As depicted in the above Formula (I), the segment includes at least one phenylene group when t is 0 (illustrated in Formula (IB)) and includes at least two phenylene groups when t is 1 (illustrated in Formula (IA)). The segments of each of Formulas (IA) and (IB) may optionally include one or more additional phenylene or other aryl or heteroaryl groups in addition to those depicted. Although aryl groups having a six-carbon aromatic ring are presently preferred, it is contemplated that any other suitable aryl or heteroaryl groups may be used in place of the phenylene groups depicted in Formula (I). As depicted in the above Formula (I), the substituent groups (e.g., —O—, H, $R^1$, and $R^2$) of each phenylene group can be located at any position on the ring relative to one another, although in certain preferred embodiments at least one $R^1$ is positioned on the ring immediately adjacent to the oxygen atom. In other embodiments in which other aryl or heteroarylene group(s) are used in place of the depicted phenylene group(s) in Formula (I), it is contemplated that the same would hold true for the substituent groups of such other aryl or heteroarylene group(s).

Further information regarding segments of Formula (I), Formula (IA), and Formula (IB) can be found in the above-mentioned U.S. Pat. No. 9,409,219 B2 and in U.S. Published Application Nos. US 2013/0316109 A1 and US 2017/0029657 A1.

While it is contemplated that the segments of Formula (I) may be incorporated into the polymer or aromatic adhesion promoter using ingredients other than a polyepoxide compound, in preferred embodiments some, or all, of the segments of Formula (I) are incorporated into the polymer or aromatic adhesion promoter using a polyepoxide compound, and more preferably a diepoxide compound. To form a polymer the polyepoxide compound may be upgraded by reaction with an extender (e.g., a diol which is preferably a polyhydric phenol) to form a binder polymer, more preferably a polyether binder polymer, of a suitable molecular weight using any suitable extender or combinations of extenders. As discussed above, diols (e.g., polyhydric phenols, and dihydric phenols in particular) are preferred extenders. Examples of other suitable extenders may include polyacids (and diacids in particular) or phenol compounds having both a phenol hydroxyl group and a carboxylic group (e.g., para hydroxy benzoic acid or para hydroxy phenyl acetic acid). Conditions for such reactions are generally carried out using standard techniques that are known to one of skill in the art or that are exemplified in the examples section. To form an aromatic adhesion promoter the polyepoxide compound may be reacted, for example, with phosphoric acid or sulfuric acid.

The epoxy groups (also commonly referred to as "oxirane" groups) of the polyepoxide compound may be attached to the compound via any suitable linkage, including, for example, ether-containing or ester-containing linkages. Glycidyl ethers of polyhydric phenols and glycidyl esters of polyhydric phenols are preferred polyepoxide compounds, with diglycidyl ethers being particularly preferred.

A preferred polyepoxide compound for use in incorporating segments of Formula (I) into the polymers or adhesion promoters of the present invention is depicted in the below Formula (II):

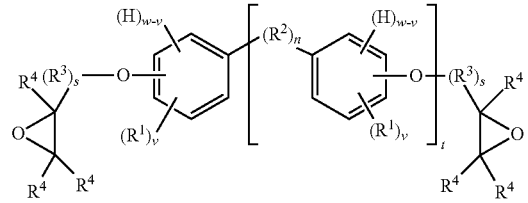

Formula (II)

wherein:
$R^1$, $R^2$, n, t, v, and w are as described above for Formula (I);
s is 0 to 1, more preferably 1;
$R^3$, if present, is a divalent group, more preferably a divalent organic group; and
preferably each $R^4$ is independently a hydrogen atom, a halogen atom, or a hydrocarbon group that may include one or more heteroatoms; more preferably each $R^4$ is a hydrogen atom.

When t is 1, the polyepoxide of Formula (II) is a segment of the below Formula (IIA).

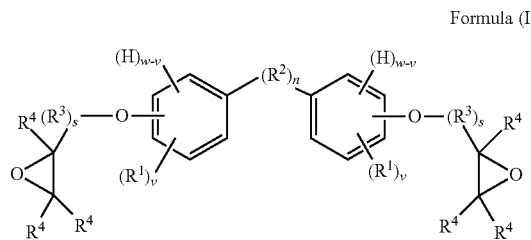

Formula (IIA)

When t is 0, the polyepoxide of Formula (II) is a segment of the below Formula (IIB).

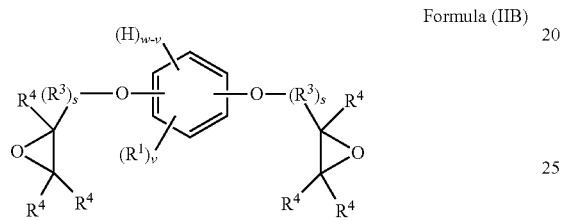

Formula (IIB)

$R^2$ can be any suitable divalent group including, for example, carbon-containing groups (which may optionally include heteroatoms such as, e.g., N, O, P, S, Si, a halogen atom, etc.), sulfur-containing groups (including, e.g., a sulfur atom, a sulfinyl group (—S(O)—), a sulfonyl group (—S(O2)-), etc.), oxygen-containing groups (including, e.g., an oxygen atom, a ketone group, etc.), nitrogen-containing groups, or a combination thereof. In preferred embodiments, R2 is present and is an organic group containing up to about 15 carbon atoms. In one embodiment, R2 includes 8 carbon atoms in a divalent linking chain and 7 carbon atoms pendant to the linking chain. In another embodiment R2 is a methylene group. R2 will typically be a saturated or unsaturated hydrocarbon group, more typically a saturated divalent alkyl group, and most preferably an alkyl group that doesn't constrain the movement of the connected phenylene groups in an orientation similar to that of diethylstilbestrol or dienestrol.

R3 is typically a hydrocarbyl group, which may optionally include one or more heteroatoms. Preferred hydrocarbyl groups include groups having from one to four carbon atoms, with methylene groups being particularly preferred. In some embodiments, R3 includes a carbonyl group. In one such embodiment, R3 includes a carbonyl group that is attached to the oxygen atom depicted in Formula (II) (e.g., as in an ester linkage).

In presently preferred embodiments, R4 is a hydrogen atom.

Preferred polyepoxide compounds of Formula (II) are non-mutagenic, more preferably non-genotoxic. A useful test for assessing both mutagenicity and genotoxicity is the mammalian in vivo assay known as the in vivo alkaline single cell gel electrophoresis assay (referred to as the "comet" assay). The method is described in: Tice, R. R. "The single cell gel/comet assay: a microgel electrophoretic technique for the detection of DNA damage and repair in individual cells." Environmental Mutagenesis. Eds. Phillips, D. H and Venitt, S. Bios Scientific, Oxford, U D, 1995, pp. 315-339. A negative test result in the comet assay indicates that a compound is non-genotoxic and, therefore, non-mutagenic, though a positive test does not definitively indicate the opposite and in such cases a more definitive test may be utilized (e.g., a two-year rat feeding study).

In some embodiments, the polyepoxide compound of Formula (II) is formed via epoxidation of a dihydric phenol compound (e.g., via a reaction using epichlorohydrin or any other suitable material). Such a dihydric phenol compound is depicted in the below Formula (III), wherein $R^1$, $R^2$, n, t, v, and w are as in Formula (I):

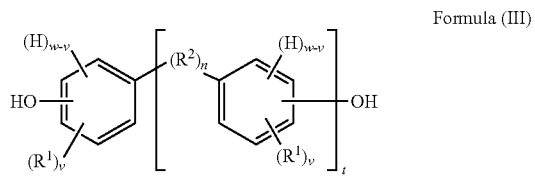

Formula (III)

When t is 1, the compound of Formula (III) is of the below Formula (IIIA).

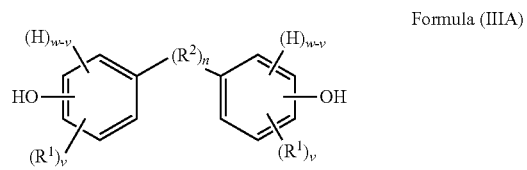

Formula (IIIA)

When t is 0, the compound of Formula (III) is of the below Formula (IIIB).

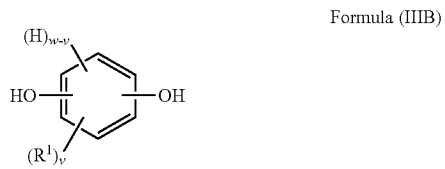

Formula (IIIB)

Preferred compounds of Formula (III) do not exhibit appreciable estrogenic activity. Preferred appreciably non-estrogenic compounds exhibit a degree of estrogen agonist activity, in a competent in vitro human estrogen receptor assay, that is preferably less than that exhibited by 4,4'-(propane-2,2-diyl)diphenol in the assay, even more preferably less than that exhibited by bisphenol S in the assay, even more preferably less than that exhibited by 4,4'-(propane-2,2-diyl)bis(2,6-dibromophenol) in the assay, and optimally less than about that exhibited by 2,2-bis(4-hydroxyphenyl)propanoic acid in the assay. It has been found that compounds such as 4,4'-methylenebis(2,6-di-t-butylphenol), 2,2'-methylenebis(4-methyl-6-t-butylphenol), 4,4'-methylenebis(2,6-dimethylphenol), 4,4'butylidenebis (2-t-butyl-5-methylphenol), and 2,5-di-t-butylhydroquinone do not exhibit appreciable estrogenic activity in a suitable in vitro assay whose results are known to be directly correlated to the results of the MCF-7 cell proliferation assay ("MCF-7 assay") through analysis of common reference compounds.

The MCF-7 assay is a useful test for assessing whether a polyhydric phenol compound is appreciably non-estrogenic. The MCF-7 assay uses MCF-7, clone WS8, cells to measure whether and to what extent a substance induces cell proliferation via estrogen receptor (ER)-mediated pathways. The method is described in "Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEATM) on Jan. 19, 2006 (available online at http://iccvam.niehs.nih.gov/methods/endocrine/endodocs/SubmDoc.pdf).

Compounds having no appreciable estrogenic activity may be beneficial in the event that any unreacted, residual compound may be present in a cured coating composition. While the balance of scientific data does not indicate that the presence in cured coatings of very small amounts of residual compounds having estrogenic activity in an in vitro recombinant cell assay pose a human health concern, the use of compounds having no appreciable estrogenic activity in such an assay may nonetheless be desirable from a public perception standpoint. Thus, in preferred embodiments, the polymer of the present invention is preferably formed using polyhydric phenol compounds that do not exhibit appreciable estrogenic activity in the MCF-7 assay.

While not intending to be bound by any theory, as previously discussed, it is believed that the presence of substituent groups (i.e., a group other than a hydrogen atom) at one or more of the ortho or meta positions of each phenylene ring of the Formula (III) compound, relative to the phenol hydroxyl group of each ring, can reduce or effectively eliminate any estrogenic activity. It is believed that the inhibition/elimination of estrogenic activity may be attributable to one or more of the following: (a) steric hindrance of the phenol hydroxyl group (which may cause the overall polyhydric phenol structure to be sufficiently different from estrogenically active compounds such as diethylstilbestrol), (b) the compound having an arranged molecular weight due to the presence of the one or more substituent groups, (c) the presence of polar groups or (d) ortho hydroxyl groups relative to R2. Substitution at one or both of the ortho positions of each phenylene ring is presently preferred for certain embodiments as it is believed that ortho substitution can provide the greatest steric hindrance for the hydroxyl group.

As previously discussed, structural features other than the presence of suitable R1 groups (e.g., features such as (b), (c), and (d) of the preceding paragraph) are believed to inhibit/eliminate estrogenic activity, even in the absence of any R1 groups.

It is believed that molecular weight may be a structural characteristic pertinent to whether a polyhydric phenol is appreciably non-estrogenic. For example, while not intending to be bound by any theory, it is believed that if a sufficient amount of relatively "densely" packed molecular weight is present in a polyhydric phenol, it can prevent the compound from being able to fit into the active site of an estrogen receptor (irrespective of whether the polyhydric phenol includes any ortho or meta R1 groups). In some embodiments, it may be beneficial to form a polyether polymer from one or more polyhydric phenols (whether "hindered" or not) that includes at least the following number of carbon atoms: 20, 21, 22, 23, 24, 25, or 26 carbon atoms. In one such embodiment, a polyhydric phenol of Formula (III) is used to make the polyether polymer, where (a) v is independently 0 to 4 and (b) R2 is of the formula —C(R7)(R8)- and includes at least 8, at least 10, at least 12, or at least 14 carbon atoms (or otherwise has an R2 of sufficiently high atomic weight to prevent the compound from fitting into the active site).

The presence of one or more polar groups on the polyhydric phenol compounds of Formula (III) may be beneficial in certain embodiments, particularly for certain embodiment of Formula (IIIA). The polar groups may be located at any suitable location of the compounds of Formula (III), including in R1 or R2. Suitable polar groups may include ketone, carboxyl, carbonate, hydroxyl, phosphate, sulfoxide, and the like, any other polar groups disclosed herein, and combinations thereof. Further information regarding segments of Formula (III), Formula (IIIA), and Formula (IIIB) can be found in the above-mentioned U.S. Pat. No. 9,409,219 B2 and in U.S. Published Application Nos. US 2013/0316109 A1 and US 2017/0029657 A1.

The term "upgrade dihydric phenol" is used hereinafter to refer to a polyhydric phenol capable of participating in a reaction with the polyepoxide of Formula (II) to build molecular weight and preferably form a polymer. Any suitable upgrade polyhydric phenol may be used in forming a polymer of the present invention. However, the use of bisphenol A is not preferred. Preferred upgrade dihydric phenols are free of bisphenol A and preferably do not exhibit appreciable estrogenic activity.

Examples of suitable upgrade dihydric phenols for use in forming the polyether polymer include any of the compounds of Formula (III) (or other suitable extender compounds), with compounds of Formula (III) in which the hydroxyl group are unhindered by adjacent R groups being generally preferred for purposes of reaction efficiency. Some specific examples of suitable upgrade dihydric phenols include hydroquinone, catechol, p-tert-butyl catechol, resorcinol, substituted variants thereof, or a mixture thereof. Hydroquinone is a presently preferred compound.

It is also contemplated that the polymer of the present invention may be formed via reaction of ingredients including the dihydric phenol compound of Formula (III) and a diepoxide other than that of Formula (II). Examples of such compounds include compounds such as 1,4-cyclohexanedimethanol diglycidyl ether (CHDMDGE), neopentyl glycol diglycidyl ether, 2-methy-1,3-propanediol diglycidyl ether, tricyclodecane dimethanol diglycidyl ether, 2,2,4,4-tetramethyl-1,3-cyclobutanediol diglycidyl ether, and combinations thereof. While not intending to be bound by any theory, some such aliphatic diepoxides (e.g., CHDMDGE and neopentyl glycol diglycidyl ether) that tend to yield polymers having lower Tg values may not be suitable for certain interior packaging coating applications in which a relatively high Tg polymer is desirable for purposes of corrosion resistance, although they may be suitable for exterior packaging coating applications or other end uses.

If desired, one or more comonomers or co-oligomers may be included in the reactants used to generate the polymer of the present invention. Non-limiting examples of such materials include adipic acid, azelaic acid, terephthalic acid, isophthalic acid, and combinations thereof. The comonomers or cooligomers may be included in an initial reaction mixture of polyepoxide and polyhydric phenol or may be post-reacted with the resulting polyether oligomer or polymer. In presently preferred embodiments, a comonomer or cooligomer is not utilized to produce a polyether polymer of the present invention.

Preferred polymers of the present invention may be made in a variety of molecular weights.

Preferred polyether polymers of the present invention have a number average molecular weight (Mn) of at least 2,000, more preferably at least 3,000, and even more preferably at least 4,000. The molecular weight of the polyether polymer may be as high as is needed for the desired application. Typically, however, the Mn of the polyether polymer, when adapted for use in a liquid coating composition, will not exceed about 11,000. In some embodiments, the polyether polymer has an Mn of about 5,000 to about 8,000. In embodiments where the polymer of the present invention is a copolymer, such as for example a polyether-acrylic copolymer, the molecular weight of the overall polymer may be higher than that recited above, although the molecular weight of the polyether polymer portion will typically be as described above. Typically, however, such copolymers will have an Mn of less than about 20,000.

The polymer of the present invention may exhibit any suitable polydispersity index (PDI). In embodiments in which the polymer is a polyether polymer intended for use as a binder polymer of a liquid applied packaging coating (e.g., a food or beverage can coating), the polyether polymer will typically exhibit a PDI of from about 1.5 to 5, more typically from about 2 to 3.5, and in some instances from about 2.2 to 3 or about 2.4 to 2.8.

Advancement of the molecular weight of the polymer may be enhanced by the use of a catalyst in the reaction of a diepoxide with one or more upgrade comonomers such as, e.g., a polyhydric phenol of Formula (IV). Typical catalysts usable in the advancement of the molecular weight of the epoxy material of the present invention include amines, hydroxides (e.g., potassium hydroxide), phosphonium salts, and the like. A presently preferred catalyst is a phosphonium salt catalyst. The phosphonium catalyst useful in the present invention is preferably present in an amount sufficient to facilitate the desired condensation reaction.

Alternatively, epoxy-terminated polymers of the present invention may be reacted with fatty acids to form polymers having unsaturated (e.g., air oxidizable) reactive groups, or with acrylic acid or methacrylic acid to form free-radically curable polymers.

Advancement of the molecular weight of the polymer may also be enhanced by the reaction of a hydroxyl- or epoxy-terminated polymer of the present invention with a suitable diacid (such as adipic acid).

As discussed above, in certain preferred embodiments, the coating composition of the present invention is suitable for use in forming a food-contact packaging coating. In order to exhibit a suitable balance of coating properties for use as a food-contact packaging coating, including suitable corrosion resistance when in prolonged contact with packaged food or beverage products which may be of a corrosive nature, the polymer of the present invention preferably has a glass transition temperature ("Tg") of at least 60° C., more preferably at least 70° C., and even more preferably at least 80° C. In preferred embodiments, the Tg is less than 150° C., more preferably less than 130° C., and even more preferably less than 110° C. Tg can be measured via differential scanning calorimetry ("DSC") using the methodology disclosed in the Test Methods section. In preferred embodiments, the polymer is a polyether polymer exhibiting a Tg pursuant to the aforementioned Tg values.

While not intending to be bound by any theory, it is believed that it is important that the polymer exhibit a Tg such as that described above in applications where the coating composition will be in contact with food or beverage products during retort processing at high temperature (e.g., at temperatures at or above about 100° C. and sometimes accompanied by pressures in excess of atmospheric pressure), and particularly when retort processing food or beverage products that are more chemically aggressive in nature. It is contemplated that, in some embodiments, such as, for example, where the coating composition is intended for use as an exterior varnish on a food or beverage container, the Tg of the polymer may be less than that described above (e.g., as low as about 30° C.) and the coating composition may still exhibit a suitable balance of properties in the end use.

When the Tg of a polymer is referenced herein in the context of a coating composition including the polymer or a coated article coated with such a coating composition, the indicated Tg value for the polymer refers to the Tg of the polymer prior to any cure of a coating composition including the polymer.

While not intending to be bound by any theory, it is believed that the inclusion of a sufficient number of aryl or heteroaryl groups (typically phenylene groups) in the polyether polymer binder of the present invention is an important factor for achieving suitable coating performance for food-contact packaging coatings, especially when the product to be packaged is a so called "hard-to-hold" food or beverage product. Sauerkraut is an example of a hard-to-hold product. In preferred embodiments, aryl or heteroaryl groups constitute at least 25 wt. %, more preferably at least 30 wt. %, even more preferably at least 35 wt. %, and optimally at least 45 wt. % of the polyether polymer, based on the total weight of aryl and heteroaryl groups in the polymer relative to the weight of the polyether polymer. The upper concentration of aryl/heteroaryl groups is not particularly limited, but preferably the amount of such groups is configured such that the Tg of the polyether polymer is within the Tg ranges previously discussed. The total amount of aryl or heteroaryl groups in the polyether polymer will typically constitute less than about 80 wt. %, more preferably less than 75 wt. %, even more preferably less than about 70 wt. %, and optimally less than 60 wt. % of the polyether polymer. The total amount of aryl or heteroaryl groups in the polyether polymer can be determined based on the weight of aryl- or heteroaryl-containing monomer incorporated into the polyether polymer and the weight fraction of such monomer that constitutes aryl or heteroaryl groups. In embodiments where the polymer is a polyether copolymer (e.g., a polyether-acrylic copolymer), the weight fraction of aryl or heteroaryl groups in the polyether polymer portion(s) of the copolymer will generally be as described above, although the weight fraction relative to the total weight of the copolymer may be less.

Preferred aryl or heteroaryl groups include less than 20 carbon atoms, more preferably less than 11 carbon atoms, and even more preferably less than 8 carbon atoms. The aryl or heteroaryl groups preferably have at least 4 carbon atoms, more preferably at least 5 carbon atoms, and even more preferably at least 6 carbon atoms. Substituted or unsubstituted phenylene groups are preferred aryl or heteroaryl groups. Thus, in preferred embodiments, the polyether fraction of the polymer includes an amount of phenylene groups pursuant to the amounts recited above.

In one embodiment, the polymer of the present invention does not include any structural units derived from hydrogenated bisphenol A or a diepoxide of hydrogenated bisphenol A.

The polymers of the present invention can be applied to a substrate as part of a coating composition that includes a liquid carrier. The liquid carrier may be water, organic solvent, or mixtures of various such liquid carriers. Accordingly, liquid coating compositions of the present invention may be either water-based or solvent-based systems. Examples of suitable organic solvents include glycol ethers, alcohols, aromatic or aliphatic hydrocarbons, dibasic esters, ketones, esters, and the like, and combinations thereof.

Preferably, such carriers are selected to provide a dispersion or solution of the polymer for further formulation.

It is expected that a polyether polymer of the present invention may be substituted for any conventional epoxy polymer present in a packaging coating composition known in the art. Thus, for example, the polyether polymer of the present invention may be substituted, for example, for a BPA/BADGE-containing polymer of an epoxy/acrylic latex coating system, for a BPA/BADGE-containing polymer of a solvent based epoxy coating system, etc.

The amount of binder polymer of the present invention included in coating compositions may vary widely depending on a variety of considerations such as, for example, the method of application, the presence of other film-forming materials, whether the coating composition is a water-based or solvent-based system, etc. For liquid-based coating compositions, however, the binder polymer of the present invention will typically constitute at least 10 wt. %, more typically at least 30 wt. %, and even more typically at least 50 wt. % of the coating composition, based on the total weight of resin solids in the coating composition. For such liquid-based coating compositions, the binder polymer will typically constitute less than about 90 wt. %, more typically less than about 80 wt. %, and even more typically less than about 70 wt. % of the coating composition, based on the total weight of resin solids in the coating composition.

In one embodiment, the coating composition is an organic solvent-based composition preferably having at least 20 wt. % non-volatile components ("solids"), and more preferably at least 25 wt. % non-volatile components. Such organic solvent-based compositions preferably have no greater than 40 wt. % non-volatile components, and more preferably no greater than 25 wt. % non-volatile components. For this embodiment, the non-volatile film-forming components preferably include at least 50 wt. % of the polymer of the present invention, more preferably at least 55 wt. % of the polymer, and even more preferably at least 60 wt. % of the polymer. For this embodiment, the non-volatile film-forming components preferably include no greater than 95 wt. % of the polymer of the present invention, and more preferably no greater than 85 wt. % of the polymer.

In some embodiments, the coating composition of the present invention is a solvent-based system that includes no more than a de minimus amount of water (e.g., less than 2 wt. % of water), if any. One example of such a coating composition is a solvent-based coating composition that includes no more than a de minimus amount of water and includes: on a solids basis, from about 30 to 99 wt. %, more preferably from about 50 to 85 wt. % of polyether polymer of the present invention; a suitable amount of crosslinker (e.g., a phenolic crosslinker or anhydride crosslinker); and optionally inorganic filler (e.g., TiO2) or other optional additives. In one such solvent-based coating composition of the present invention, the polyether polymer is a high molecular weight polyether polymer that preferably has an Mn of about 7,500 to about 10,500, more preferably about 8,000 to 10,000, and even more preferably about 8,500 to about 9,500.

In one embodiment, the coating composition is a water-based composition preferably having at least 15 wt. % non-volatile components. In one embodiment, the coating composition is a water-based composition preferably having no greater than 50 wt. % non-volatile components, and more preferably no greater than 40 wt. % non-volatile components. For this embodiment, the non-volatile components preferably include at least 5 wt. % of the polymer of the present invention, more preferably at least 25 wt. % of the polymer, even more preferably at least 30 wt. % of the polymer, and optimally at least 40 wt. % of the polymer. For this embodiment, the non-volatile components preferably include no greater than 70 wt. % of the polymer of the present invention, and more preferably no greater than 60 wt. % of the polymer.

If a water-based system is desired, techniques may be used such as those described in U.S. Pat. Nos. 3,943,187; 4,076,676; 4,247,439; 4,285,847; 4,413,015; 4,446,258; 4,963,602; 5,296,525; 5,527,840; 5,830,952; 5,922,817; 7,037,584; and 7,189,787. Water-based coating systems of the present invention may optionally include one or more organic solvents, which will typically be selected to be miscible in water. The liquid carrier system of water-based coating compositions will typically include at least 50 wt. % of water, more typically at least 75 wt. % of water, and in some embodiments more than 90 wt. % or 95 wt. % of water. Any suitable means may be used to render the polymer of the present invention miscible in water. For example, the polymer may include a suitable amount of salt groups such as ionic or cationic salt groups to render the polymer miscible in water (or groups capable of forming such salt groups). Neutralized acid or base groups are preferred salt groups.

In some embodiments, the polymer of the present invention is covalently attached to one or more materials (e.g., oligomers or polymers) having salt or salt-forming groups to render the polymer water-dispersible. The salt or salt-forming group containing material may be, for example, oligomers or polymers that are (i) formed in situ prior to, during, or after formation of the polymer of the present invention or (ii) provided as preformed materials that are reacted with a preformed, or nascent, polymer of the present invention. The covalent attachment may be achieved through any suitable means including, for example, via reactions involving carbon-carbon double bonds, hydrogen abstraction (e.g., via a reaction involving benzoyl peroxide mediated grafting via hydrogen abstraction such as, e.g., described in U.S. Pat. No. 4,212,781), or the reaction of complimentary reactive functional groups such as occurs, e.g., in condensation reactions. In one embodiment, a linking compound is utilized to covalently attach the polyether polymer and the salt- or salt-forming-group-containing material. In certain preferred embodiments, the one or more materials having salt or salt-forming groups is an acrylic material, more preferably an acid- or anhydride-functional acrylic material.

In one embodiment, a water-dispersible polymer may be formed from preformed polymers (e.g., (a) an oxirane-functional polymer, such as, e.g., a polyether polymer, preferably having at least one segment of Formula (I) and (b) an acid-functional polymer such as, e.g., an acid-functional acrylic polymer) in the presence of an amine, more preferably a tertiary amine. If desired, an acid-functional polymer can be combined with an amine, more preferably a tertiary amine, to at least partially neutralize it prior to reaction with an oxirane-functional polymer preferably having at least one segment of Formula (I).

In another embodiment, a water-dispersible polymer may be formed from an oxirane-functional polymer (more preferably a polyether polymer described herein) preferably having at least one segment of Formula (I) that is reacted with ethylenically unsaturated monomers to form an acid-functional polymer, which may then be neutralized, for example, with a base such as a tertiary amine. Thus, for example, in one embodiment, a water-dispersible polymer preferably having at least one segment of Formula (I) may be formed pursuant to the acrylic polymerization teachings of U.S. Pat. No. 4,285,847 or 4,212,781, which describe techniques for grafting acid-functional acrylic groups (e.g., via use of benzoyl peroxide) onto epoxy-functional polymers. In another embodiment, acrylic polymerization may be achieved through reaction of ethylenically unsaturated monomers with unsaturation present in the polymer preferably containing at least one segment of Formula (I). See, for example, U.S. Pat. No. 4,517,322 or U.S. Published Application No. 2005/0196629 for examples of such techniques.

In another embodiment, a water-dispersible polymer may be formed having the structure E-L-A, wherein E is an epoxy portion of the polymer formed from a polyether polymer described herein, A is a polymerized acrylic portion of the polymer, and L is a linking portion of the polymer which covalently links E to A. Such a polymer can be prepared, for example, from (a) a polyether polymer described herein preferably having about two epoxy groups, (b) an unsaturated linking compound preferably having (i) a carbon-carbon double bond, a conjugated carbon-carbon double bonds or a carbon-carbon triple bond and (ii) a functional group capable of reacting with an epoxy group (e.g., a carboxylic group, a hydroxyl group, an amino group, an amido group, a mercapto group, etc.). Preferred linking compounds include 12 or less carbon atoms, with sorbic acid being an example of a preferred such linking compound. The acrylic portion preferably includes one or more salt groups or salt-forming groups (e.g., acid groups such as present in α,β-ethylenically saturated carboxylic acid monomers). Such polymers may be formed, for example, using a BPA- and BADGE-free polyether polymer of the present invention in combination with the materials and techniques disclosed in U.S. Pat. No. 5,830,952 or U.S. Published Application No. 2010/0068433.

In some embodiments, the coating composition of the present invention is substantially free of acrylic components. For example, in some embodiment the coating composition includes less than about 5 wt. % or less than about 1 wt. % of polymerized acrylic monomers (e.g., a mixture of ethylenically unsaturated monomers that include at least some monomer selected from acrylic acid, methacrylic acid, or esters thereof).

In another embodiment, a polymer preferably containing segments of Formula (I) and including —CH2-CH(OH)—CH2— or —CH2-CH2-CH(OH)— segments, which are derived from an oxirane, is reacted with an anhydride. This provides acid functionality which, when combined with an amine or other suitable base to at least partially neutralize the acid functionality, is water dispersible.

In some embodiments, the coating composition of the present invention is a low VOC coating compositions that preferably includes no greater than 0.4 kilograms ("kg") of volatile organic compounds ("VOCs") per liter of solids, more preferably no greater than 0.3 kg VOC per liter of solids, even more preferably no greater than 0.2 kg VOC per liter of solids, and optimally no greater than 0.1 kg VOC per liter of solids.

Reactive diluents may optionally be used to yield such low VOC coating compositions. The reactive diluent preferably functions as a solvent or otherwise lowers the viscosity of the blend of reactants. The use of one or more reactive diluents as a "solvent" eliminates or reduces the need to incorporate a substantial amount of other cosolvents (such as butanol) during processing.

Reactive diluents suitable for use in the present invention preferably include free-radical reactive monomers and oligomers. A small amount of reactive diluent that can undergo reaction with the polymer of the present invention may be used (e.g., hydroxy monomers such as 2-hydroxy ethylmethacrylate, amide monomers such as acrylamide, and N-methylol monomers such as N-methylol acrylamide). Suitable reactive diluents include, for example, vinyl compounds, acrylate compounds, methacrylate compounds, acrylamides, acrylonitriles, and the like and combinations thereof. Suitable vinyl compounds include, for example, vinyl toluene, vinyl acetate, vinyl chloride, vinylidene chloride, styrene, substituted styrenes, and the like and combinations thereof. Suitable acrylate compounds include butyl acrylate, ethyl acrylate, 2-ethylhexyl acrylate, isobutyl acrylate, tert-butyl acrylate, methyl acrylate, 2-hydroxyethyl acrylate, poly(ethylene glycol)acrylate, isobornyl acrylate, and combinations thereof. Suitable methacrylate compounds include, for example, butyl methacrylate, methyl methacrylate, ethyl methacrylate, isobutyl methacrylate, 2-hydroxyethyl methacrylate, poly(ethylene glycol)methacrylate, poly(propylene glycol)methacrylate, and the like and combinations thereof. Preferred reactive diluents include styrene and butyl acrylate. U.S. Pat. No. 7,037,584 provides additional discussion of suitable materials and methods relating to the use of reactive diluents in low-VOC packaging coating compositions.

Any suitable amount of one or more reactive diluents may optionally be employed in coating composition of the present invention. For example, an amount of one or more reactive diluents sufficient to achieve the VOC content of the aforementioned low-VOC coating compositions may be used. In some embodiments, the coating composition includes at least about 1 wt. %, at least about 5 wt. %, or at least 10 wt. % of polymerized reactive diluent.

In one embodiment, a polyether polymer of the present invention is blended, in any suitable order, with acrylic component (e.g., acrylic resin) and reactive diluent. The polyether polymer and the acrylic component are preferably reacted with one another (although they may be used as a simple blend), either before or after addition of reactive diluents, to form a polyether-acrylate copolymer. The polyether-acrylate and the reactive diluents are preferably further dispersed in water. The reactive diluent is then preferably polymerized in the presence of the polyether-acrylate copolymer to form a coating composition having the desired low VOC content. In this context, the term "reactive diluent" relates to monomers and oligomers that are preferably essentially non-reactive with the polyether resin or any carboxylic acid moiety (or other functional group) that might be present, e.g., on the acrylic resin, under contemplated blending conditions. The reactive diluents are also preferably capable of undergoing a reaction to form a polymer, described as an interpenetrating network with the polymer of the present invention, or with unsaturated moieties that may optionally be present, e.g., on an acrylic resin.

The compositions of the present invention preferably comprise an adhesively effective amount of an aromatic adhesion promoter as described herein. Suitable aromatic adhesion promoters include sulfonized, or phosphatized oligomers that include one or more segments (e.g., 1, 2, 3, or 4 or more) of Formula (I). Suitable aromatic adhesion promoters include multifunctional oligomers having chemical groups capable of reacting with steel and aluminum substrates as well as with polymer functional groups presents in coatings.

In one embodiment, the aromatic adhesion promoter is formed by reacting a polyepoxide compound of Formula (II) with a suitable sulfur-based, or phosphorus-based acid.

Organic acids suitable for forming adhesion promoters, advantageously have a multiplicity of acid functional groups. This enables the acid to react with an epoxide of a diepoxide oligomer and still have a remaining acid for subsequent reaction, e.g., with a substrate. Such functional groups include the phosphoric acid group {—P(O)(OH)2}, the sulfonic acid group {—S(O)(O)OH}, the sulfinic acid group {—S(O)OH} and mixtures thereof.

Suitable sulfurous acids include a sulfinic acid, a sulfonic acid or preferably sulfuric acid. The sulfuric acid can be in the form of an aqueous solution, for example, a 79 percent by weight aqueous solution, or can be nearly pure sulfuric acid. The acid is suitably provided in amounts of about 0.05 to 1, preferably 0.1 to 0.8, more preferably 0.2 to 0.6 equivalents of acid per equivalent of glycidyl ether, i.e., S—OH groups per oxirane group.

Suitable phosphorus acids include a phosphinic acid, a phosphonic acid or preferably phosphoric acid. The phosphoric acid can be in the form of an aqueous solution, for example, an 85 percent by weight aqueous solution, or can be 100 percent phosphoric acid or super phosphoric acid. The acid is suitably provided in amounts of about 0.05 to 1, preferably 0.1 to 0.8, more preferably 0.2 to 0.6 equivalents of acid per equivalent of glycidyl ether, i.e., P—OH groups per oxirane group.

The reaction of the sulfurous or phosphorus acid (preferably phosphorous acid) with the polyepoxide compound of Formula (II) is typically conducted in organic solvent. The organic solvent is preferably a hydroxyl functional compound, typically a monofunctional compound having a boiling point of about 65 to 250° C. Among the hydroxyl functional compounds which may be used are aliphatic alcohols, cycloaliphatic alcohols and alkyl ether alcohols. Particularly preferred hydroxyl functional compounds are n-butanol, 2-butoxyethanol (aka "butyl glycol"), and the like. The organic solvent for the reaction is typically present in amounts of about 25 to 50 percent by weight based on total weight of acid (preferably phosphorus acid), polyepoxide compound and organic solvent.

The reactants and the organic solvent are typically mixed at a temperature between 50° C. to 100° C. and once the reactants are contacted, the reaction mixture is maintained at a temperature preferably between 90° C. to 110° C. The reaction typically is allowed to proceed for a period of about 45 minutes to 6 hours.

The aromatic adhesion promoter is typically present in the coating composition in amounts up to 10 wt. %, preferably 0.1 to 6 wt. %, more preferably 0.2 to 5 wt. %, based on weight of resin solids in the coating composition. Amounts less than 0.1 wt. % typically result in inferior adhesion of the coating composition to the substrate and amounts greater than 10 wt. % typically provide no additional advantage.

The present invention advantageously replaces conventional epoxy phosphates containing bisphenol A with aromatic-based alternatives. Surprisingly, preferred aromatic adhesion promoters of the present invention provide better performance than a BPA-based compound. In one embodiment, the aromatic adhesion promoter is made using the reaction product of phosphoric acid and tetramethyl bisphenol F (TMBPF). In another embodiment the aromatic adhesion promoter is made using the reaction product of phosphoric acid and Cardolite NC-514, which comprises a diepoxide of Formula (IIA), wherein R1 is null, R2 is (CH2)7-CH((CH2)6-CH3), R3 is CH2, R4 is H, v is 0, w is 4, n is 1, s is 1. It is believed that Cardolite NC-514 is made using cardanol as an ingredient. Cardanol is a meta-substituted phenol derived from cashew nut shell liquid. Being a naturally occurring material, cardanol is not a pure material. Consequently, Cardolite NC-514, which is made from cardanol, also has impurities and an epoxy functionality of slightly greater than 2

Thus, in some embodiments, the aromatic adhesion promoter is derived from cardanol, more preferably an epoxidized cardanol-based compound.

The aromatic adhesion promoter can have any suitable molecular weight. In some embodiments, the aromatic adhesion promoter has a number average molecular weight of less than 7,000, less than 4,000, less than 3,000, less than 2,000, less than 1,500, or less than 1,000. In some embodiments, the aromatic adhesion promoter is a non-polymeric material.

The aromatic adhesion promoter may be used in combination with non-aromatic BPA-free adhesion promoters, though coating performance may suffer. Examples of such non-aromatic adhesion promoters include the reaction product of phosphoric acid and cyclohexanedimethanol diglycidyl ether and the reaction product of phosphoric acid and neopentyl glycol diglycidyl ether. While not intending to be bound by theory, it is presently believed that performance is optimized by the use of aromatic-based adhesion promoters.

A coating composition of the present invention may also include other optional ingredients that do not adversely affect the coating composition or a cured coating composition resulting therefrom. Such optional ingredients are typically included in a coating composition to enhance composition esthetics; to facilitate manufacturing, processing, handling, or application of the composition; or to further improve a particular functional property of a coating composition or a cured coating composition resulting therefrom. For example, the composition that includes a polymer of the present invention may optionally include crosslinkers, fillers, catalysts, lubricants, pigments, surfactants, dyes, colorants, toners, coalescents, extenders, anticorrosion agents, flow control agents, thixotropic agents, dispersing agents, antioxidants, oxygen-scavenging materials, additional adhesion promoters, light stabilizers, and mixtures thereof, as required to provide the desired film properties. Each optional ingredient is preferably included in a sufficient amount to serve its intended purpose, but not in such an amount to adversely affect a coating composition or a cured coating composition resulting therefrom.

Preferred compositions are substantially free of one or both of mobile BPA or mobile BADGE, and more preferably essentially free of these compounds, even more preferably essentially completely free of these compounds, and optimally completely free of these compounds. The coating composition (and preferably each ingredient included therein) is also preferably substantially free of one or both of bound BPA and bound BADGE, more preferably essentially free of these compounds, even more preferably essentially completely free of these compounds, and optimally completely free of these compounds. In addition, preferred compositions (and preferably each ingredient included therein) are also substantially free, more preferably essentially free, even more preferably essentially completely free, and optimally completely free of one or more or all of: bisphenol S, bisphenol F, and the diglycidyl ether of bisphenol F or bisphenol S.

It has been discovered that coating compositions incorporating the aforementioned polymer-containing compositions may be formulated using one or more optional curing agents (e.g., crosslinking resins, sometimes referred to as "crosslinkers"). The choice of particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of mobile or bound BPA and BADGE and more preferably completely free of mobile or bound BPA and BADGE. Suitable examples of such curing agents are hydroxyl-reactive curing resins such as phenoplasts, aminoplast, blocked or unblocked isocyanates, or mixtures thereof.

Suitable phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, cyclopentylphenol, and compounds of Formula (III) or any other polyhydric phenols disclosed herein.

Suitable aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

Examples of other generally suitable curing agents are the blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have an Mn of at least about 300, more preferably at least about 650, and even more preferably at least about 1,000.

Polymeric blocked isocyanates are useful in certain embodiments. Some examples of suitable polymeric blocked isocyanates include a biuret or isocyanurate of a diisocyanate, a trifunctional "trimer," or a mixture thereof. Examples of suitable blocked polymeric isocyanates include Trixene BI 7951, Trixene BI 7984, Trixene BI 7963, Trixene BI 7981 (Trixene materials are available from Baxenden Chemicals, Ltd., Accrington, Lancashire, England), Desmodur BL 3175A, Desmodur BL3272, Desmodur BL3370, Desmodur BL 3475, Desmodur BL 4265, Desmodur PL 340, Desmodur VP LS 2078, Desmodur VP LS 2117, and Desmodur VP LS 2352 (Desmodur materials are available from Bayer Corp., Pittsburgh, Pa., USA), or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

The level of curing agent (e.g., crosslinker) used will typically depend on the type of curing agent, the time and temperature of the bake, the molecular weight of the binder polymer, and the desired coating properties. If used, the crosslinker is typically present in an amount of up to 50 wt. %, preferably up to 30 wt. %, and more preferably up to 15 wt. %. If used, a crosslinker is preferably present in an amount of at least 0.1 wt. %, more preferably at least 1 wt. %, and even more preferably at least 1.5 wt. %. These weight percentages are based upon the total weight of the resin solids in the coating composition.

In some embodiments, the coating composition of the present invention are "formaldehyde-free" coatings that include, or liberate as a result of curing, no greater than 1% by weight formaldehyde, no greater than 0.5% by weight formaldehyde, no greater than 0.25% by weight formaldehyde, or no greater than 5 ppm formaldehyde. The absence of phenolic resin or melamine is believed to contribute to a coating composition that is appreciably free of formaldehyde.

As previously discussed, in some embodiments, the coating composition of the present invention includes an acrylic component which may optionally be blended with or covalently attached to the polyether polymers or polyester polymers described herein.

The coating composition of the present invention may include any amount of acrylic component suitable to produce the desired film or coating properties. In some acrylic-component-containing embodiments, the coating composition includes an amount of acrylic component of at least about 5 wt. % more preferably at least about 10 wt. %, and even more preferably at least about 15 wt. % as determined by an amount of a monomer mixture used to prepare the acrylic component and based on the total weight of resin solids in the coating system. In such embodiments, the coating composition preferably includes an amount of acrylic component of less than about 95 wt. %, more preferably less than about 75 wt. %, and even more preferably less than about 30 to 40 wt. %, as determined by an amount of a monomer mixture used to prepare the acrylic component and based on the total weight of resin solids in the coating system.

In certain water-based embodiments in which at least some of the acrylic component is covalently attached to the polyether polymer, at least a portion of the acrylic monomers used to form the acrylic component are preferably capable of rending the polyether polymer dispersible in water. In such embodiments, the acrylic component is preferably formed from an ethylenically unsaturated monomer mixture that includes one or more α,β-unsaturated carboxylic acid. The one or more α,β-unsaturated carboxylic acid preferably renders the polymer water-dispersible after neutralization with a base. Suitable α,β-unsaturated carboxylic acid monomers include, for example, acrylic acid, methacrylic acid, crotonic acid, itaconic acid, maleic acid, mesaconic acid, citraconic acid, sorbic acid, fumaric acid, and mixtures thereof. The acrylic monomer also can include, for example, acrylamide or methacrylamide, which can render the polymer water dispersible. Preferred acrylic components for use in packaging coating applications are substantially free, or completely free, of acrylamide- or methacrylamide-type monomers.

The acrylic monomers used to form the acrylic component can include 0% up to about 95%, by total weight of monomers, of vinyl monomers.

The acrylic component preferably includes one or more non-functional monomers and one or more functional monomers (more preferably acid-functional monomers, and even more preferably acid-functional acrylic monomers). In presently preferred embodiments, the acrylic component includes one or more vinyl monomers. The acrylic component is preferably prepared through chain-growth polymerization using one or more ethylenically unsaturated monomers.

Examples of suitable ethylenically unsaturated non-functional monomers such as styrene, halostyrenes, α-methylstyrene, alkyl esters of acrylic acid (e.g., methyl acrylate, ethyl acrylate, butyl acrylate, etc.), alkyl esters of methacrylic acid or crotonic acid (e.g., methyl, ethyl, propyl, butyl, pentyl, hexyl, octyl, decyl, dodecyl methacrylates and crotonates), vinyl cyclohexane, vinyl cyclooctane, vinyl cyclohexene, hexanediol diacrylate, dimethyl maleate, dibutyl fumarate and similar diesters, vinyl naphthalene, vinyl toluene, vinyl acetate, vinyl propionate, vinyl cyclooctane, ally methacrylate, 2-ethylhexyl acrylate, and diesters of maleic anhydride. Preferred non-functional monomers include styrene, ethyl acrylate, butyl methacrylate, and combinations thereof.

Examples of functional monomers include α,β-unsaturated carboxylic acids such as, e.g., those previously described; amide-functional monomers; hydroxy-functional monomers (e.g., hydroxyalkyl acrylate or methacrylate monomers such as hydroxyethyl acrylate (HEA), hydroxyethyl methacrylate (HEMA), hydroxypropyl acrylate (HPA), hydroxypropyl methacrylate (HPMA), etc.); oxirane-functional monomers (e.g., glycidyl acrylate and glycidyl methacrylate) and variations and combinations thereof. Preferred non-functional monomers include styrene, ethyl acrylate, butyl methacrylate, and combinations thereof. Preferred functional monomers include acrylic acid, methacrylic acid, and combinations thereof.

The combination or ratio(s) of the above monomers of the acrylic component may be adjusted to provide a desired coating or film property. Preferably, at least a portion of the above monomers of the acrylic component are capable of rendering the resin system dispersible in an aqueous carrier. Examples of monomers capable of rendering the resin system dispersible in an aqueous carrier include acid-functional monomers that form salt groups upon neutralization with a base.

While not intending to be bound by theory, it is believed that, for certain embodiments of the present invention, the Tg of the acrylic component is a factor that can contribute to coating compositions exhibiting suitable resistance to retort processes associated with certain food and beverage products. In general, the Fox equation may be employed to calculate the theoretical Tg of the acrylic component. In some embodiments, the acrylic component has a Tg of at least about 40° C., preferably at least about 60° C., more preferably at least about 80° C., and even more preferably at least about 90° C. By way of example, a water-dispersible polymer having an E-L-A described previously herein can include an acrylic component having such a Tg. The acrylic component preferably has a Tg of less than about 280° C., more preferably less than about 220° C., even more preferably less than about 180° C., even more preferably less than about 160° C., and optimally less than about 150° C. In some embodiments, the acrylic component has a Tg of less than about 130° C., or less than about 120° C. In some embodiments, the acrylic component has a Tg greater than about 100° C., more preferably from about 100° C. to about 120° C.

In other embodiments, it may be beneficial to use an acrylic component having a Tg of less than 50° C., 40° C., or even less than 30° C. For example, in certain embodiments in which high resistance to retort processing conditions is not a requirement, such an acrylic component may be used to confer one or more other desired properties.

A coating composition of the present invention may also include other optional polymers that do not adversely affect the coating composition or a cured coating composition resulting therefrom. Such optional polymers are typically included in a coating composition as a filler material, although they can also be included, for example, as a binder polymer, a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such additional polymeric materials can be nonreactive, and hence, simply function as fillers. Such optional nonreactive filler polymers include, for example, polyesters, acrylics, polyamides, polyethers, and novalacs. Alternatively, such additional polymeric materials or monomers can be reactive with other components of the composition (e.g., an acid-functional or unsaturated polymer). If desired, reactive polymers can be incorporated into the compositions of the present invention, to provide additional functionality for various purposes, including crosslinking or dispersing the polymer of the present invention into water. Examples of such reactive polymers include, for example, functionalized polyesters, acrylics, polyamides, and polyethers. Preferred optional polymers are substantially free or essentially free of bound BPA and BADGE, and more preferably essentially completely free or completely free of bound such compounds.

One preferred optional ingredient is a catalyst to increase the rate of cure. Examples of catalysts, include, but are not limited to, strong acids (e.g., phosphoric acid, dodecylbenzene sulphonic acid (DDBSA), available as CYCAT 600 from Cytec, methane sulfonic acid (MSA), p-toluene sulfonic acid (pTSA), dinonylnaphthalene disulfonic acid (DNNDSA), and triflic acid); quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt. %, and more preferably at least 0.1 wt. %, based on the weight of nonvolatile material in the coating composition. If used, a catalyst is preferably present in an amount of no greater than 3 wt. %, and more preferably no greater than 1 wt. %, based on the weight of nonvolatile material in the coating composition.

Another useful optional ingredient is a lubricant (e.g., a wax), which facilitates manufacture of fabricated metal articles (e.g., closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt. %, and preferably no greater than 2 wt. %, and more preferably no greater than 1 wt. %, based on the total weight of nonvolatile material in the coating composition.

Another useful optional ingredient is a pigment, such as titanium dioxide. If used, a pigment is present in the coating composition in an amount of no greater than 70 wt. %, more preferably no greater than 50 wt. %, and even more preferably no greater than 40 wt. %, based on the total weight of solids in the coating composition.

Surfactants can be optionally added to the coating composition, e.g., to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt. %, and more preferably at least 0.1 wt. %, based on the weight of resin solids. If used, a surfactant is preferably present in an amount no greater than 10 wt. %, and more preferably no greater than 5 wt. %, based on the weight of resin solids.

In some embodiments, the polyether polymer of the invention is included in a layer of a monolayer or multilayer coating system including a layer incorporating a thermoplastic dispersion (e.g., a halogenated polyolefin dispersion such as, e.g., a polyvinylchloride ("PVC") organosol). In one embodiment, the polyether polymer is included a primer layer of such a multilayer coating system including another layer (e.g., a top layer) incorporating a thermoplastic dispersion. Such multilayer coating systems are described in Published International Application No. WO 2014/025411 A1 entitled "Container Coating System". In another embodiment, the polyether polymer is included in the layer incorporating the thermoplastic dispersion, e.g., as a stabilizer for PVC or as a co-resin, which is described in Published International Application No. WO 2014/025410 A1 entitled "Stabilizer and Coating Compositions Thereof".

In some embodiments, the coating composition is "PVC-free." That is, in some embodiments, the coating composition preferably contains less than 2 wt. % of vinyl chloride materials, more preferably less than 0.5 wt. % of vinyl chloride materials, and even more preferably less than 1 ppm of vinyl chloride materials.

In some embodiments, the coating composition is "styrene-free." That is, in some embodiments, the coating composition preferably contains less than 2 wt. %, more preferably less than 0.5 wt. % and even more preferably less than 1 ppm of styrene monomer in any acrylic polymer or oligomer in the composition.

The coating composition of the present invention can be present as a layer of a mono-layer coating system or one or more layers of a multi-layer coating system. The coating composition can be used as a primer coat, an intermediate coat, a top coat, or a combination thereof. The coating thickness of a particular layer and the overall coating system will vary depending upon the coating material used, the substrate, the coating application method, and the end use for the coated article. Mono-layer or multi-layer coating systems including one or more layers formed from a coating composition of the present invention may have any suitable overall coating thickness, but will typically have an overall average dry coating thickness of from about 1 to about 60 microns and more typically from about 2 to about 15 microns. Typically, the average total coating thickness for rigid metal food or beverage can applications will be about 3 to about 10 microns. Coating systems for closure applications may have an average total coating thickness up to about 15 microns. In certain embodiments in which the coating composition is used as an interior coating on a drum (e.g., a drum for use with food or beverage products), the total coating thickness may be approximately 25 microns.

The coating composition of the present invention may be applied to a substrate either prior to, or after, the substrate is formed into an article (such as, for example, a food or beverage container or a portion thereof). In one embodiment, a method is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, riveted beverage can ends having a cured coating of the present invention on a surface thereof can be formed in such a process. In another embodiment, the coating composition is applied to a preformed metal food or beverage can, or a portion thereof. For example, in some embodiments, the coating composition is spray applied to an interior surface of a preformed food or beverage can (e.g., as typically occurs with "two-piece" food or beverage cans). After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the present invention can be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If metal coil is the substrate to be coated, curing of the applied coating composition may be conducted, for example, by heating the coated metal substrate over a suitable time period to a peak metal temperature ("PMT") of preferably greater than about 350° F. (177° C.). More preferably, the coated metal coil is heated for a suitable time period (e.g., about 5 to 900 seconds, more typically about 5 to 30 seconds) to a PMT of at least about 425° F. (218° C.).

The coating compositions of the present invention are particularly useful for coating metal substrates. The coating compositions may be used to coat packaging articles such as a food or beverage container, or a portion thereof. In preferred embodiments, the container is a food or beverage can and the surface of the container is the surface of a metal substrate. The polymer can be applied to a metal substrate either before or after the substrate is formed into a can (e.g., two-piece cans, three-piece cans) or portions thereof, whether it be a can end or can body. Preferred polymers of the present invention are suitable for use in food-contact situations and may be used on the inside of such cans. They are particularly useful on the interior of two-piece or three-piece can ends or bodies.

The metal substrate used in forming rigid food or beverage cans, or portions thereof, typically has a thickness in the range of about 0.005 inches to about 0.025 inches. Electro tinplated steel, cold-rolled steel, and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The coating compositions of the present invention may be suitable, for example, for spray coating, coil coating, wash coating, sheet coating, and side seam coating (e.g., food can side seam coating). A further discussion of such application methods is provided below. It is contemplated that coating compositions of the present invention may be suitably used in each of these application methods discussed further below, including the end uses associated therewith.

Spray coating includes the introduction of the coated composition into the inside of a preformed packaging container. Typical preformed packaging containers suitable for spray coating include food cans, beer and beverage containers, and the like. The spray process preferably utilizes a spray nozzle capable of uniformly coating the inside of the preformed packaging container. The sprayed preformed container is then subjected to heat to remove any residual carriers (e.g., water or solvents) and harden the coating.

In one embodiment, the coating composition of the present invention is a water-based "inside spray" coating suitable for spray application to the interior surfaces of a two-piece food or beverage can, which preferably includes from about 15 to about 40 wt. % of nonvolatile materials, more preferably 15 to 25 wt. % nonvolatile materials for inside spray for two-piece beer and beverage cans. Preferred inside spray coatings of the present invention are capable of passing both the Initial Metal Exposure and Metal Exposure After Drop Can Damage tests described in the below Test Methods section.

A coil coating is described as the coating of a continuous coil composed of a metal (e.g., steel or aluminum). Once coated, the coating coil is subjected to a short thermal, ultraviolet, or electromagnetic curing cycle, for hardening (e.g., drying and curing) of the coating. Coil coatings provide coated metal (e.g., steel or aluminum) substrates that can be fabricated into formed articles, such as two-piece drawn food cans, three-piece food cans, food can ends, drawn and ironed cans, beverage can ends, and the like. In one embodiment, the coating composition of the present invention is a water-based coating composition that is applied to aluminum or steel coating from which riveted beverage can ends are subsequently fabricated. Accordingly, in certain preferred embodiments, the coating composition is capable of passing the Metal Exposure test described in the below Test Methods.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, the coating is hardened (e.g., dried and cured) and the coated sheets are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends (including, e.g., riveted beverage can ends having a rivet for attaching a pull tab thereto), and the like. In one embodiment, the coating composition of the present invention is a solvent-based coating composition that is applied to steel or aluminum sheets that are subsequently fabricated into the above described packaging articles.

A side seam coating is described as the application of a coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of coating, which protects the exposed "weld" from subsequent corrosion or other effects to the contained foodstuff. The coatings that function in this role are termed "side seam stripes." Typical side seam stripes are spray applied and cured quickly via residual heat from the welding operation in addition to a small thermal, ultraviolet, or electromagnetic oven.

Other commercial coating application and curing methods are also envisioned, for example, electrocoating, extrusion coating, laminating, powder coating, and the like.

In certain preferred embodiments, the coating composition of the present invention is capable of exhibiting one or more (and in some embodiments all) of the following coating properties: good blush resistance, good corrosion resistance, good stain resistance, good flexibility (e.g., good resistance to drop can damage, suitability for use as a beverage can end coating, etc), and good adhesion to metal substrate), when subjected to the testing described below in Examples.

In embodiments in which the coating composition is intended for use as an internal packaging coating, the coating composition, when suitably cured, preferably has suitable corrosion resistance to withstand prolonged contact with the packaged product, as well as any processing conditions, without unsuitably degrading. Preferred interior packaging coating compositions, when applied on suitable metal substrate (e.g., a metal substrate used in the below Examples section) at a coating thickness consistent with that typically used in the particular packaging end use and suitably cured, are capable of withstanding being immersed in a 2% aqueous NaCl solution for 90 minutes at a temperature of 121° C. and a pressure of 1.05 kilograms per square centimeter without exhibiting any unsuitable film integrity reduction such as blistering or loss of adhesion (e.g., using the methods of the Test Methods section). Preferred interior beverage can end coatings are preferably capable of passing the above test using an aqueous 1% citric acid solution in place of the 2% NaCl solution.

Test Methods

Unless indicated otherwise, the following test methods were utilized in the Examples that follow. Other suitable test methods for evaluating the performance of the coating are described in U.S. Pat. No. 9,415,900.

Adhesion

Adhesion testing is performed to assess whether the coating adheres to the coated substrate. The adhesion test was performed according to ASTM D 3359—Test Method B, using SCOTCH 610 tape (available from 3M Company of Saint Paul, Minn.). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Solvent Resistance

The extent of "cure" or crosslinking of a coating is measured as a resistance to solvents, such as methyl ethyl ketone (MEK) (available from Exxon, Newark, N.J.). This test is performed as described in ASTM D 5402-93. The number of double-rubs (i.e., one back- and forth motion) is reported. This test is often referred to as "MEK Resistance."

NVC—Non-Volatile Content

Non-volatile content was measured by weighing approximately 1 gram of material into a metal pan, and then placing the pan with the sample in an oven set at 180° C. for 30 minutes. The sample was weighed and the non-volatilized content was expressed as a percentage of the initial sample weight.

Noury Viscosity

Viscosity was measured using a falling ball method and a Noury-Visco (available from Robbe) device. The diameter of the glass tube was 60 mm. The diameter of the metal ball was 2 mm. Temperature of the testing was 25° C., using a regulated water bath to maintain consistency of the temperature. The metal balls were allowed to fall a distance of 104 mm and the time for that travel was measured. Measurement was not started until the ball had traveled at least 10 mm into the test liquid, i.e., the ball was released at the surface of the test sample, allowed to fall at least 10 mm, then the clock was started and the ball was allowed to fall a further 104 mm into the sample and the time for that travel recorded. The viscosity was measured in Poise and the average of at least two tests was recorded. See the Noury Visco device directions and ISO 12058-2 for further details on this test method.

EXAMPLES

The following examples are offered to aid in understanding of the present invention and are not to be construed as limiting the scope thereof. Unless otherwise indicated, all parts and percentages are by weight. The constructions cited were evaluated by tests as follows:

Example 1: Diepoxide of Ortho-Substituted Dihydric Phenol 4,4'-Methylenebis(2,6-dimethylphenol) (32 grams, 0.125 moles), epichlorohydrin (140 milliliters, 1.79 moles), and 2-propanol (150 milliliters) were heated to 80° C. in an oil bath. Sodium hydroxide (12.5 grams, 0.313 moles) in water (20 milliliters) was added in portions over 5 minutes. The purple solution was heated for 2 hours at 80° C. The mixture was cooled to room temperature, filtered, and concentrated on a rotary evaporator at a temperature of about 30-40° C. The remaining oil was mixed with dichloromethane (50 milliliters) and heptane (100 milliliters) and allowed to stir for 30 minutes at ambient temperature. The salts were removed by filtration and the filtrate was concentrated on a rotary evaporator at 30-40° C. The remaining oil was dried under high vacuum at ambient temperature until a constant weight was obtained. The crude product was crystallized twice from methanol (250 milliliters) and dried under high vacuum at ambient temperature until a constant weight was obtained. The experiment generated diglycidyl ether of 4,4'-methylenebis(2,6-dimethylphenol) (28 grams, 60% yield) as a white solid. The epoxy value was 0.543 equivalents per 100 grams.

Example 2: Synthesis of an Aromatic Adhesion Promoter

The following ingredients were used to prepare an aromatic adhesion promoter.

TABLE 1

| | Raw material | Weight |
|---|---|---|
| Reactor | | |
| 1 | Cardolite NC 514 (WPE = ~445 g/mol) | 1752.11 |
| 2 | Butyl Glycol | 608.74 |
| Premix tank | | |
| 3 | Butyl Glycol | 500 |
| 4 | DI Water | 57.9 |
| 5 | $H_3PO_4$ at [85%] | 57.9 |
| 6 | Butyl Glycol flush | 23.26 |
| | Total | 2999.91 |

Reaction process: In a round bottom flask equipped with total condenser and with nitrogen blanket, Cardanol-diglycidyl ether (Cardolite NC-514 available from Cardolite Corporation, Newark N.J.) (item 1) and Butyl Glycol (item 2) were added and heated to 95-100° C. under stirring. At 95-100° C., pre-mixed butyl glycol (item 3), De-ionized water (item 4) and phosphoric acid 85% (item 5) were added over 120 minutes to the reactor keeping the temperature between 95 and 100° C. When the premix was all-in, the addition line was flushed with butyl glycol (item 6) and the temperature was held between 95 and 100° C. until the acid value was between 14 and 18 and the Noury viscosity was between 9 and 12 Poise at 25° C. Total reaction time was approximately 5 hours. The reaction mix was cooled down to 50° C. under stirring, filtered and then cooled to room temperature.

Example 3: Synthesis of Adhesion Promoters

A series of diglycidyl ether phosphate oligomers were synthesized following the process of Example 2 above. The oligomers were made using BPA-DGE, TMBPF-DGE, Cardanol-DGE, CHDM-DGE, and NPG-DGE as ingredients, and then reacting these ingredients with phosphoric acid as described in Example 2.

The oligomers (or a mixture of oligomers) are detailed in Table 2 below:

Solvent Resistance and Blush Resistance were tested on coatings containing the adhesion promoter that were applied

TABLE 2

|  | BPA-DGE-phosphate (control) | TMBPF-DGE-and Cardanol-DGE phosphate (mix 50/50) | Cardanol-DGE phosphate and NPG-DGE-phosphate (mix 50/50) | Cardanol-DGE phosphate and CHDM-DGE-phosphate (mix 50/50) | Cardanol-DGE-phosphate |
|---|---|---|---|---|---|
| Equivalent of oxirane groups (DGE 1) (mol) | 5 (BADGE) | 2.64 (TMBPF-DGE) | 1.30 (Cardanol-DGE) | 41.82 (Cardanol-DGE) | 49.40 (Cardanol-DGE) |
| Equivalent of oxirane groups (DGE 2) (mol) | Not applicable | 1.30 (Cardanol-DGE) | 2.64 (NPG-DGE) | 84.78 (CHDM-DGE) | Not applicable |
| Equivalent of acid function (mol) | 1.68 | 1.51 | 1.51 | 39.09 | 19.12 |
| Equivalent of water (mol) | 4.08 | 3.70 | 3.70 | 45.32 | 46.95 |
| NVC (1 g/180° C./30 min) | 62-64% | 66.8% | 63.5% | 66-68% | 64-66% |
| Acid Values ("AV" or "AN") (mg KOH/g wet resin) | 45-50 | 26 | 30.2 | 15-17 | 14-18 |
| Noury Viscosity at 25° C. (P) | 16-21 | 20 | 8 | 10-12 | 9-12 |

Example 4: Packing Coating Compositions Containing Adhesion Promoter

Varnishes were formulated by adding 3 wt. % adhesion promoter (based on total composition weight) to a conventional polyester coating composition that did not contain any other adhesion promoter.

The compositions were evaluated for Solvent Resistance, Blush Resistance and Adhesion as described herein.

to aluminum cans, cured for 30 seconds at 177° C., and then pasteurized for 30 minutes at 82° C. in a 1% solution of Joy® detergent, a 0.3% solution of sodium sulfate or a 0.5% solution of sodium phosphate.

Adhesion was tested on coatings containing the adhesion promoter that were applied to aluminum cans after being cured for 30 seconds at 171° C. or 177° C. The results are described in Table 3 below.

TABLE 3

|  | BPA-DGE-phosphate (control) | TMBPF-DGE-phosphate | Cardanol-DGE phosphate and NPG-DGE-phosphate (mix 50/50) | Cardanol-DGE phosphate and CHDM-DGE-phosphate (mix 50/50) | Cardanol-DGE-phosphate |
|---|---|---|---|---|---|
| Solvent Resistance (Cure at 171° C. See foot-note 1) | 100 | 100 | 80 | 70 | 75 |
| Solvent Resistance (Cure at 177° C. See foot-note 2) | 100 | 100 | 95 | 80 | 100 |
| Blush/Adhesion (After pasteurization with Joy detergent. See footnote 3) | 10/10 | 10/10 | 10/10 | 10/10 | 10/10 |
| Blush/Adhesion (After pasteurization with a 0.3% solution of sodium sulfate. See footnote 4) | 8/10 | 8/10 | 8/10 | 7/10 | 10/10 |

TABLE 3-continued

|  | BPA-DGE-phosphate (control) | TMBPF-DGE-phosphate | Cardanol-DGE phosphate and NPG-DGE-phosphate (mix 50/50) | Cardanol-DGE phosphate and CHDM-DGE-phosphate (mix 50/50) | Cardanol-DGE-phosphate |
|---|---|---|---|---|---|
| Blush/Adhesion (After pasteurization with a 0.5% solution of sodium phosphate. See footnote 5) | 8/10 | 7/10 | 7/8 | 7/7 | 10/10 |

Footnotes:
1: Varnish was applied on aluminum cans and the cans cured for 30 seconds at 171° C. Solvent Resistance (as a proxy for degree of cure) was determined according to the test method described herein and a value of "100" indicates that the coating survived at least 100 MEK double rubs. A value of less than 100 indicates the actual number of double rubs that were achieved.
2: Varnish was applied on aluminum cans and the cans cured for 30 seconds at 177° C. Solvent Resistance (as a proxy for degree of cure) was determined according to the test method described herein and a value of "100" indicates that the coating survived at least 100 MEK double rubs. A value of less than 100 indicates the actual number of double rubs that were achieved.
3: Varnish was applied on aluminum cans and the cans cured for 30 seconds at 177° C. The cans were then pasteurized for 30 minutes at 82° C. in a 1% solution of Joy ® detergent. Varnish was evaluated for blush and adhesion. (Each rated on a scale from 0 to 10, with 10 being best.)
4: Varnish was applied on aluminum cans and the cans were cured for 30 seconds at 177° C. The cans were then pasteurized for 30 minutes at 82° C. in a 0.3% solution of sodium sulfate. Varnish was evaluated for blush and adhesion. (Each rated on a scale from 0 to 10, with 10 being best.)
5: Varnish was applied on aluminum cans and the cans were cured for 30 seconds at 177° C. The cans were then pasteurized for 30 minutes at 85° C. in a 0.5% solution of sodium phosphate. Varnish was evaluated for blush and adhesion. (Each rated on a scale from 0 to 10, with 10 being best.)

As can be seen, the BADGE-phosphate control performed very well, with the exception that Blush resistance after pasteurization in a 0.3% solution of sodium sulfate and a 0.5% solution of sodium phosphate were lower than ideal. The varnishes using solely an aromatic adhesion promoter of the present invention performed essentially equally well to the control, and in one case performed better than the control for Blush Resistance, Solvent Resistance and Adhesion when cured at 177° C.

The complete disclosure of all patents, patent applications, and publications, and electronically available material cited herein are incorporated by reference, including each of the following: U.S. Pat. Nos. 7,592,047 B2, 8,092,876 B2, 8,142,868 B2, 8,168,276 B2, 8,173,265 B2, 8,617,663 B2, 8,835,012 B2, 9,242,763 B2, 9,409,219 B2 and 9,415,900 B2; U.S. Published Application Nos. US 2013/0280455 A1, US 2013/0316109 A1, US 2015/0021323 A1, US 2015/0125642 A1, US 2017/0029657 A1, US 2017/0051177 A1, US 2017/0096521 A1 and US 2017/0096579 A1; and Published International Application Nos. WO 2016/105504 A1, WO 2016/118502 A1 and WO 2018/125895 A1. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

The invention claimed is:

1. A coating composition, comprising:
a binder polymer; and
an aromatic adhesion promoter,
wherein the aromatic adhesion promoter is the reaction product of an aromatic diepoxide and a sulfur-based or phosphorus-based acid, the reaction product has a number average molecular weight of less than 7,000, and the coating composition is substantially free of each of mobile or bound bisphenol A, bisphenol F, bisphenol S, and epoxides thereof; and wherein the aromatic diepoxide is a cashew nut shell liquid diepoxy.

2. The coating composition of claim 1, wherein the coating composition is substantially free of polyhydric phenols that exhibit an estrogenic agonist activity in the MCF-7 cell proliferation assay greater than or equal to that exhibited by 4,4'-(propane-2,2-diyl)diphenol in the assay, and epoxides thereof.

3. The coating composition of claim 1, wherein the coating composition is free of any dihydric phenols, or corresponding diepoxides, that exhibit an estrogenic agonist activity in the MCF-7 cell proliferation assay greater than about that of 4,4'-(propane-2,2-diyl)bis(2,6-dibromophenol).

4. The coating composition of claim 1, wherein the binder polymer comprises a polyester resin, acrylic resin, a polyether resin, a grafted polyester-acrylic resin, a grafted polyether-acrylic resin, a grafted polyester-epoxy resin, or a combination thereof.

5. The coating composition of claim 1, wherein the coating composition is a liquid thermoset coating composition that includes a crosslinker.

6. The coating composition of claim 1, wherein the binder polymer is incorporated into or forms a water-soluble or water-dispersible composition.

7. The coating composition of claim 1, wherein the binder polymer comprises one or more segments of the below Formula (1):

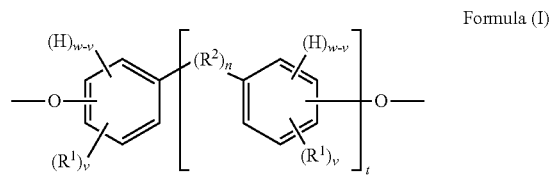

Formula (I)

wherein:
each of the pair of oxygen atoms depicted in Formula (I) is present in an ether or ester linkage;
H denotes a hydrogen atom, if present;
each $R^1$ is independently an atom or group having at atomic weight of at least 15 Daltons;

v is independently 0 to 4;
w is 4;
when v is 1 to 4, each of the phenylene groups depicted in Formula (I) includes at least one $R^1$ attached to the ring at an ortho position relative to the depicted oxygen atom;
$R^2$, if present, is a divalent group when any v is not 0; and $R^2$, if present, is a divalent group other than —C(CH$_3$)$_2$—, —CH$_2$— and —SO$_2$— when all v's are 0;
n is 0 or 1, with the proviso that if n is 0, the phenylene groups depicted in Formula (I) can optionally join to form a fused ring system in which case w is 3 and v is 0 to 3;
t is 0 or 1; and
two or more $R^1$ or $R^2$ groups can optionally join to form one or more cyclic groups.

8. The coating composition of claim 7, further comprising an aromatic adhesion promoter which is a sulfated or phosphated oligomer containing a segment of Formula (I).

9. The coating composition of claim 1, further comprising an aromatic adhesion promoter which is the reaction product of the sulfur-based or phosphorus-based acid with a diepoxide compound of Formula (II):

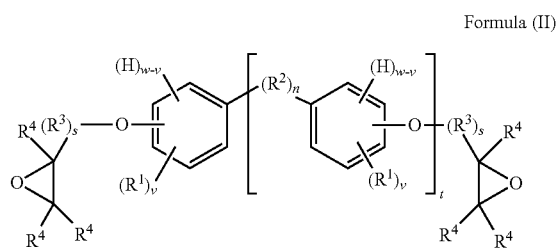

Formula (II)

wherein:
each $R^1$ is independently an atom or group having at atomic weight of at least 15 Daltons;
v is independently 0 to 4;
w is 4;
when v is 1 to 4, each of the phenylene groups depicted in Formula (II) includes at least one $R^1$ attached to the ring at an ortho position relative to the depicted oxygen atom;
$R^2$, if present, is a divalent group when any v is not 0; and $R^2$, if present, is a divalent group other than —C(CH$_3$)$_2$—, —CH$_2$— and —SO$_2$— when all v's are 0;
n is 0 or 1, with the proviso that if n is 0, the phenylene groups depicted in Formula (II) can optionally join to form a fused ring system in which case w is 3 and v is 0 to 3;
t is 0 or 1;
s is 0 to 1;
$R^3$, if present, is a divalent group; and
each $R^4$ is independently a hydrogen atom, a halogen atom, or a hydrocarbon group that may include one or more heteroatoms.

10. The coating composition of claim 1, wherein the phosphorus-based acid reactant of the aromatic adhesion promoter is a phosphinic acid, a phosphonic acid or phosphoric acid.

11. The coating composition of claim 1, wherein the aromatic adhesion promoter is made in the presence of a hydroxyl functional organic solvent having a boiling point of about 65 to 250° C.

12. The coating composition of claim 1, wherein the adhesion promoter is present in the coating composition in amounts up to 10 wt. %.

13. The coating composition of claim 1, wherein the adhesion promoter is present in the coating composition in amounts of between 0.1 to 6 wt. %.

14. A coated article, comprising a substrate having thereon a cured layer of a coating composition comprising:
a binder polymer; and
an aromatic adhesion promoter, wherein the aromatic adhesion promoter is the reaction product of an aromatic diepoxide and a sulfur-based or phosphorus-based acid, the reaction product has a number average molecular weight of less than 7,000, the coating composition is substantially free of each of mobile or bound bisphenol A, bisphenol F, bisphenol S, and epoxides thereof, and wherein the aromatic diepoxide is a cashew nut shell liquid diepoxy.

15. The coated article of claim 14, wherein the substrate is a two-piece aluminum or steel food or beverage can, and the cured layer is on an exterior surface, an interior surface, or both.

16. The coated article of claim 14, wherein the substrate is a food or beverage container, the cured layer is on an exterior surface of the food or beverage container, and the binder polymer comprises a polyester resin, acrylic resin, a polyether resin, a grafted polyester-acrylic resin, a grafted polyether-acrylic resin, a grafted polyester-epoxy resin, or a combination thereof.

17. The coated article of claim 14, wherein the substrate is a food or beverage container, the cured layer is on an exterior surface of the food or beverage container, and the binder polymer comprises a polyester resin, a grafted polyester-acrylic resin, a grafted polyester-epoxy resin, or a combination thereof.

18. A method of preparing a container, comprising: applying a coating composition comprising:
a binder polymer; and
an aromatic adhesion promoter, wherein the aromatic adhesion promoter is the reaction product of an aromatic diepoxide and a sulfur-based or phosphorus-based acid, the reaction product has a number average molecular weight of less than 7,000, the coating composition is substantially free of each of mobile or bound bisphenol A, bisphenol F, bisphenol S, and epoxides thereof, and
wherein the aromatic diepoxide is a cashew nut shell liquid diepoxy, to at least a portion of a surface of a substrate prior to or after forming the substrate into a container or a portion thereof.

19. A coating composition, comprising:
a binder polymer; and
an aromatic adhesion promoter,
wherein the aromatic adhesion promoter is the reaction product of a suitable sulfur-based or phosphorus-based acid with a diepoxide compound of Formula (II):

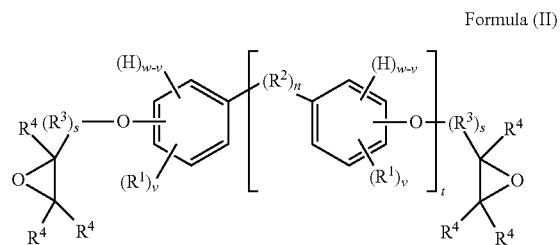

Formula (II)

wherein $R^1$ is null, $R^2$ is $(CH_2)_7$—$CH((CH_2)_6$—$CH_3)$, $R^3$ is $CH_2$, $R^4$ is H, v is 0, w is 4, n is 1, s is 1, and t is 1; and wherein the coating composition is substantially free of each of mobile or bound bisphenol A, bisphenol F, bisphenol S, and epoxides thereof.

20. A coating composition, comprising:
   a binder polymer; and
   an aromatic adhesion promoter,
wherein the binder polymer comprises a polyester resin, a grafted polyester-acrylic resin, or a combination thereof; the aromatic adhesion promoter is the reaction product of an aromatic diepoxide and a sulfur-based or phosphorus-based acid; the reaction product has a number average molecular weight of less than 7,000; the coating composition is a liquid thermoset coating composition that includes a crosslinker and is substantially free of each of mobile or bound bisphenol A, bisphenol F, bisphenol S, and epoxides thereof; the crosslinker comprises an aminoplast curing agent; and the composition further includes a lubricant, a blocked isocyanate crosslinker, or both.

21. The coating composition of claim 20, wherein the coating composition is substantially free of polyhydric phenols that exhibit an estrogenic agonist activity in the MCF-7 cell proliferation assay greater than or equal to that exhibited by 4,4'-(propane-2,2-diyl)diphenol in the assay, and epoxides thereof.

22. The coating composition of claim 20, wherein the composition is free of any dihydric phenols, or corresponding diepoxides, that exhibit an estrogenic agonist activity in the MCF-7 cell proliferation assay greater than about that of 4,4'-(propane-2,2-diyl)bis(2,6-dibromophenol).

23. The coating composition of claim 20, wherein the binder polymer comprises a polyester resin.

24. The coating composition of claim 20, wherein the binder polymer comprises a grafted polyester-acrylic resin.

25. The coating composition of claim 20, wherein the binder polymer is incorporated into or forms a water-soluble or water-dispersible composition.

26. The coating composition of claim 20, wherein the binder polymer comprises one or more segments of the below Formula (I):

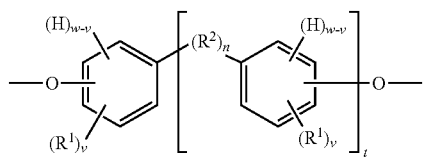

Formula (I)

wherein:
   each of the pair of oxygen atoms depicted in Formula (I) is present in an ether or ester linkage;
   H denotes a hydrogen atom, if present;
   each $R^1$ is independently an atom or group having at atomic weight of at least 15 Daltons;
   v is independently 0 to 4;
   w is 4;
   when v is 1 to 4, each of the phenylene groups depicted in Formula (I) includes at least one $R^1$ attached to the ring at an ortho position relative to the depicted oxygen atom;
   $R^2$, if present, is a divalent group when any v is not 0; and $R^2$, if present, is a divalent group other than —$C(CH_3)_2$—, —$CH_2$— and —$SO_2$— when all v's are 0;
   n is 0 or 1, with the proviso that if n is 0, the phenylene groups depicted in Formula (I) can optionally join to form a fused ring system in which case w is 3 and v is 0 to 3;
   t is 0 or 1; and
   two or more $R^1$ or R2 groups can optionally join to form one or more cyclic groups.

27. The coating composition of claim 26, wherein the aromatic adhesion promoter is an oligomer containing a segment of Formula (I).

28. The coating composition of claim 20, wherein the aromatic diepoxide is a compound of Formula (II):

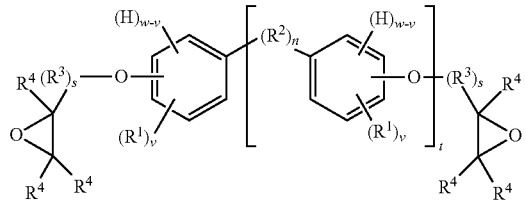

Formula (II)

wherein:
   each $R^1$ is independently an atom or group having at atomic weight of at least 15 Daltons;
   v is independently 0 to 4;
   w is 4;
   when v is 1 to 4, each of the phenylene groups depicted in Formula (II) includes at least one $R^1$ attached to the ring at an ortho position relative to the depicted oxygen atom;
   $R^2$, if present, is a divalent group when any v is not 0; and $R^2$, if present, is a divalent group other than —$C(CH_3)_2$—, —$CH_2$— and —$SO_2$— when all v's are 0;
   n is 0 or 1, with the proviso that if n is 0, the phenylene groups depicted in Formula (II) can optionally join to form a fused ring system in which case w is 3 and v is 0 to 3;
   t is 0 or 1;
   s is 0 to 1;
   $R^3$, if present, is a divalent group; and
   each $R^4$ is independently a hydrogen atom, a halogen atom, or a hydrocarbon group that may include one or more heteroatoms.

29. The coating composition of claim 20, wherein the phosphorus-based acid reactant of the aromatic adhesion promoter is a phosphinic acid, a phosphonic acid or phosphoric acid.

30. The coating composition of claim 20, wherein the aromatic adhesion promoter is made in the presence of a hydroxyl functional organic solvent having a boiling point of about 65 to 250° C.

31. The coating composition of claim 20, wherein the adhesion promoter is present in the coating composition in amounts up to 10 wt. %.

32. The coating composition of claim 20, wherein the adhesion promoter is present in the coating composition in amounts of between 0.1 to 6 wt. %.

* * * * *